United States Patent
Al-Dhahir et al.

(10) Patent No.: US 8,520,550 B2
(45) Date of Patent: Aug. 27, 2013

(54) INTRA-CELL AND INTER-CELL INTERFERENCE MITIGATION METHODS FOR ORTHOGONAL FREQUENCY-DIVISION MULTIPLE ACCESS CELLULAR NETWORKS

(71) Applicant: XW, LLC d/b/a Xtendwave, Dallas, TX (US)

(72) Inventors: Naofal Al-Dhahir, Plano, TX (US); Oren E. Eliezer, Plano, TX (US); Dennis I. Robbins, Richardson, TX (US); Aditya Awasthi, Richardson, TX (US); Zahid Islam, Dallas, TX (US); Ahmad Gomaa, Qaliobiah (EG)

(73) Assignee: XW LLC, Dallas, TX (US)

( * ) Notice: Subject to any disclaimer, the term of this patent is extended or adjusted under 35 U.S.C. 154(b) by 0 days.

(21) Appl. No.: 13/667,794

(22) Filed: Nov. 2, 2012

(65) Prior Publication Data

US 2013/0114451 A1    May 9, 2013

Related U.S. Application Data

(60) Provisional application No. 61/555,380, filed on Nov. 3, 2011, provisional application No. 61/637,380, filed on Apr. 24, 2012, provisional application No. 61/648,376, filed on May 17, 2012, provisional application No. 61/691,106, filed on Aug. 20, 2012.

(51) Int. Cl.
*G01R 31/08*    (2006.01)
(52) U.S. Cl.
USPC .......................................... 370/252; 370/329
(58) Field of Classification Search
None
See application file for complete search history.

(56) References Cited

U.S. PATENT DOCUMENTS

| | | | |
|---|---|---|---|
| 2001/0038356 A1* | 11/2001 | Frank | 343/853 |
| 2005/0174983 A1* | 8/2005 | Naguleswaran et al. | 370/347 |
| 2008/0226000 A1* | 9/2008 | Meyer | 375/347 |
| 2010/0054381 A1* | 3/2010 | Kemenczy et al. | 375/350 |
| 2010/0284546 A1* | 11/2010 | DeBrunner et al. | 381/71.2 |
| 2011/0021153 A1* | 1/2011 | Safavi | 455/63.1 |

OTHER PUBLICATIONS

Alamouti, S., "A Simple Transmit Diversity Technique for Wireless Communications," IEEE Journal on Selected Areas of Communications, vol. 16, No. 8, Oct. 1998, pp. 1451-1458.

Boudreau, G., et al., "Interference Corrdination and Cancellation for 4G Networks," IEEE Communications Magazine, vol. 47, No. 4, Apr. 2009, pp. 74-81.

Castellanos, C., et al., "Performance of Uplink Fractional Power Control in UTRAN LTE," Vehicular Technology Conference (VTC), Spring 2008, pp. 2517-2521.

Foschini, G., "Layered Space-Time Architecture for Wireless Communication in a Fading Environment When Using Multi-Element Antennas," Bell Labs Technical Journal, Autumn 1996, pp. 41-59.

Golub, G., et al., "Matrix Computations," Second Edition, John Hopkins University Press, 1989, pp. 143-144.

(Continued)

*Primary Examiner* — David Oveissi

(57) ABSTRACT

Various embodiments of a method of mitigating interference in an OFDMA cellular network and a user terminal incorporating various of the embodiments. In one embodiment, the method includes: (1) selecting at least one dominant interfering signal, (2) generating estimates of a desired signal and the at least one dominant interfering signal, (3) jointly deciding based on the estimates such that an energy of a residual error is reduced and (4) mitigating interference based on the estimates.

30 Claims, 14 Drawing Sheets

(56) References Cited

OTHER PUBLICATIONS

Hoeher, P., et al., " Single Antenna Co-Channel Interference Cancellation for TDMA," IEEE Wireless Communications, vol. 12, No. 2, Apr. 2005, pp. 30-37.

Khan, F., "LTE for 4G Mobile Broadband," Cambridge University Press, 2009, p. 409.

Kim, S., et al., "SAIC Based Iterative Receivers for MC-CDMA Celluar Systems," IEEE Vehicular Technology Conference, 2008, pp. 1122-1126.

"Mitigating Interference in LTE Networks With Sequans AIR™—Active Interference Rejection," 2012 Sequans Communications, www.sequans.com, May 10, 2012, 12 pages.

Sessia, S., et al., "LTE—The UMTS Long Term Evolution-From Theory to Practice," Second Edition Including Release 10 for LTE-Advanced, Wiley, 2011, pp. 287-290.

Younis, W., et al., "Joint Prefiltering and MLSE Equalization of Space-Time-Coded Transmissions Over Frequency-Selective Channels," IEEE Vehicular Technology Conference, Jan. 2002, pp. 144-154.

Yu, Y., et al., "Performance Analysis of Soft Frequency Reuse for Inter-cell Interference Coordination in LTE Networks," 2010 International Symposium on Communications and Information Technologies, Oct. 26-29, 2010, pp. 504-509.

* cited by examiner

INTRA-CELL AND INTER-CELL INTERFERENCE MITIGATION METHODS FOR ORTHOGONAL FREQUENCY-DIVISION MULTIPLE ACCESS CELLULAR NETWORKS

CROSS-REFERENCE TO RELATED APPLICATIONS

This application claims the benefit of the following U.S. Provisional Applications: (1) Ser. No. 61/555,380, filed by Al-Dhahir, et al., on Nov. 3, 2011, entitled "Method for Asynchronous Single-Antenna Inter-Cell Interference Cancellation (SAIC) for OFDMA Systems," (2) Ser. No. 61/637,380, filed by Islam, et al., on Apr. 24, 2012, entitled "Inter-Cell Interference Cancellation Method with Two Receive Antennas for OFDMA Systems," (3) Ser. No. 61/648,376, filed by Al-Dhahir, et al., on May 17, 2012, entitled "Inter-Cell Interference Mitigation Method Based on Joint Decoding for MIMO-OFDMA Systems," and (4) Ser. No. 61/691,106, filed by Al-Dhahir, et al., on Aug. 20, 2012, entitled "Reduced-Complexity Joint Intra- and Inter-Cell Interference Mitigation Method for MIMO-OFDMA Systems," all of which are commonly assigned with this application and incorporated herein by reference.

U.S. GOVERNMENT LICENSE RIGHTS

This invention was made with U.S. Government support under National Science Foundation SBIR Grant No. 1058599. The U.S. Government has certain rights in the invention.

TECHNICAL FIELD

This application is directed, in general, to cellular networks and, more specifically, to interference mitigation or cancellation techniques applicable to Orthogonal Frequency-Division Multiple Access (OFDMA) networks that, in some cases, employ MIMO (multiple input-multiple output).

BACKGROUND

Inter-cell interference (ICI) from base station (BTSs) in cells adjacent to a serving cell is a performance-limiting impairment for users near cell edges in cellular networks, especially for smaller cells and a lower frequency re-use factor r (see, e.g., Khan, "LTE for 4G Mobile Broadband," Cambridge University Press, 2009, and references therein). Simply put, frequency re-use calls for the overall bandwidth available to a cellular network to be divided into r frequency channels such that neighboring cells use different frequency channels (as possible) to minimize ICI. As r decreases, spectral utilization efficiency improves (since cells are configured to use more of the total bandwidth available to them) but ICI increases (since the number of neighboring cells using the same frequency channels increases). ICI adversely affects signal-to-interference ratio (SIR), reducing data rates and causing outages. When r reaches one, neighboring cells use the same frequency channels, and SIR and ICI tend to be at their worst.

To address this issue, ICI mitigation techniques have been developed to reduce outages (resulting in, e.g., dropped calls) and improve data rates (most popularly evidenced by higher Internet download speeds). Improved SIR also allows each BTS to cover more area while maintaining data rates. The expansion of each BTS's coverage region is especially attractive for rural cellular network deployments where the recently introduced OFDMA-based Long Term Evolution (LTE) cellular network standard supports a cell-size radius ranging from 5 km to 100 km, depending upon performance. In LTE vernacular, a BTS is known as an evolved-node base station (eNB).

In addition to ICI, the serving cell itself introduces interference to the user terminal by spatially multiplexing multiple data streams over the same time and frequency resources (see, e.g., Foschini, "Layered Space-Time Architecture for Wireless Communication in a Fading Environment When Using Multiple Antennas," Bell Labs, Syst. Tech. J., vol. 1, p. 41-59, Autumn 1996), a technique called MIMO. These multiple data streams might be directed to a single user or divided between or among multiple users in the same cell. The former is called single-user MIMO (SU-MIMO), and the latter is called multi-user MIMO (MU-MIMO). In both scenarios, the user terminal encounters intra-cell interference in addition to ICI.

In the LTE and proposed LTE-Advanced (LTE-A) systems, r is set at one to provide users with higher spectral efficiency, but, again, at the cost of increased ICI. Like other cellular networks, intra-cell interference and ICI from eNBs in adjacent cells, especially smaller cells, is a performance-limiting impairment. To improve performance, LTE and proposed LTE-A systems allow eNBs to use multiple transmit antennas.

In its current incarnation, LTE supports three MIMO operating modes:

(1) a spatial beamforming mode (also known as a precoding mode) in which beamformer coefficients are designed to maximize the main lobe gain of a beamformer in the direction of the desired signal while introducing spatial nulls in the directions of the dominant interfering signals;

(2) a spatial multiplexing mode in which independent information streams are transmitted to maximize the data rate, but without the benefit of spatial diversity; and (3) a spatial diversity mode in which a space-time block code (STBC) or space-frequency block code (SFBC) is used to transform information streams into correlated transmitted streams to enhance diversity in the presence of channel fading.

The spatial beamforming mode requires channel knowledge at the transmitter through a feedback channel and precoding. In contrast, the spatial multiplexing and spatial diversity modes do not require channel knowledge at the transmitter.

Unfortunately, the use of multiple transmit antennas at the eNBs introduces additional inter-antenna interference which should be carefully mitigated to achieve the best performance. This interference mitigation task is especially challenging for cell-edge users since they suffer from particularly significant ICI.

SUMMARY

One aspect provides a method of mitigating interference in an OFDMA cellular network. In one embodiment, the method includes: (1) selecting at least one dominant interfering signal, (2) generating estimates of a desired signal and the at least one dominant interfering signal, (3) jointly deciding based on the estimates such that an energy of a residual error is reduced and (4) mitigating interference based on the estimates. Another embodiment is for use in a MIMO OFDMA cellular network and includes: (1) obtaining or estimating a constellation size of an intra-cell interfering signal, (2) generating estimates of a desired signal and the intra-cell interfering signal using joint reduced-complexity near-maximumlikelihood detection, (3) computing statistics of inter-cell interfering signals and (4) mitigating interference based on the estimates and statistics.

Another aspect provides a user terminal. In one embodiment, the user terminal includes: (1) an antenna configured to effect wireless communication with an OFDMA cellular network, (2) an uplink coupled to the antenna and (3) a downlink coupled to the antenna and including a baseband section configured to: (3a) select at least one dominant interfering signal, (3b) generate estimates of a desired signal and the at least one dominant interfering signal, (3c) jointly decide based on the estimates such that an energy of a residual error is reduced and (3d) mitigate interference based on the estimates.

BRIEF DESCRIPTION

Reference is now made to the following descriptions taken in conjunction with the accompanying drawings, in which.

DETAILED DESCRIPTION

Figure 1:
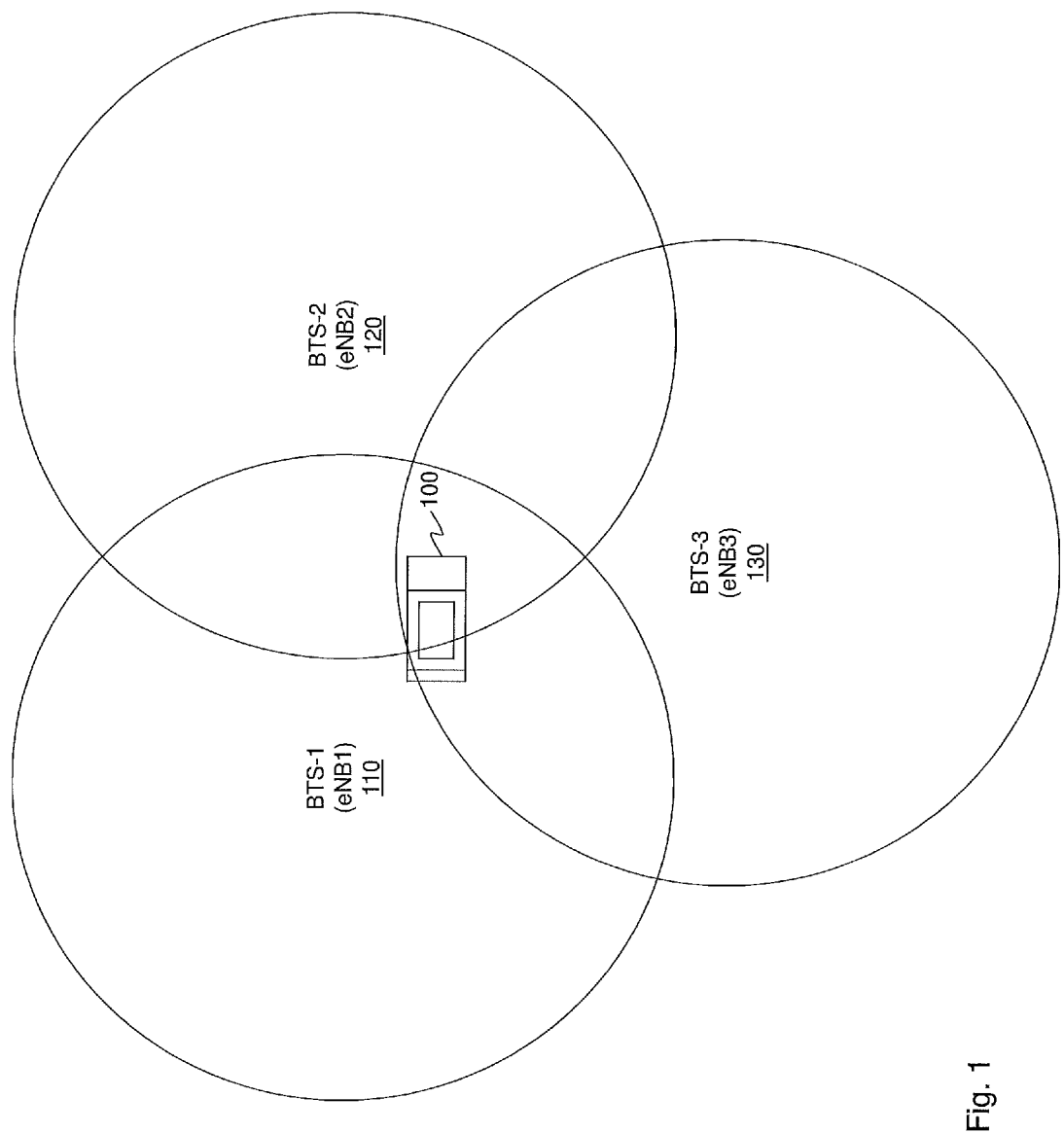
FIG. 1 is a high-level schematic diagram of one embodiment of a portion of a cellular network illustrating ICI.

Introduced herein are various embodiments of methods for mitigating (sometimes referred to as canceling) interference (ICI, intra-cell interference, or both) in the context of OFDMA cellular networks. Mitigating and canceling are synonymous with attenuating or reducing for purposes of the invention and neither imply nor require completely removing or eliminating.

The methods described herein are generally directed to receiver-based interference mitigation since, unlike transmitter-based interference mitigation methods, receiver-based methods do not require existing industrial standards governing cellular networks to be modified. Furthermore, due to the asymmetry in Internet traffic, where much higher data rates are typically needed on the downlink, certain embodiments described herein find particular advantage mitigating downlink intra-cell interference and ICI.

The following description is divided into four sections. Section A is directed to various OFDMA cellular network ICI mitigation method embodiments (sometimes called Single-Antenna ICI Cancellation, or SAIC) for use with a single receive antenna. Section B is directed to various OFDMA cellular network ICI mitigation method embodiments for use with multiple receive antennas. Section C is directed to various OFDMA cellular network ICI mitigation method embodiments for use with multiple transmit and receive antennas. Section D is directed to various joint intra-cell interference and ICI mitigation method embodiments in the context of OFDMA cellular networks employing MIMO.

A. Single-Receive-Antenna OFDMA Cellular Network ICI Mitigation Method Embodiments SAIC algorithms have been successfully commercialized for 2G Groupe Spéciale Mobile (GSM) cellular networks. For example, Hoeher, et al., "Single-Antenna Co-channel Interference Cancellation for TDMA Cellular Radio Systems," IEEE Wireless Communications, vol. 12, no. 2, pp. 30-37, April 2005, uses known channel shortening techniques (see, e.g., Younis, "Joint Prefiltering and MLSE Equalization of Space-Time-Coded Transmissions over Frequency-Selective Channels," IEEE Transactions on Vehicular Technology, pages 144-154, January 2002) to shorten the channel impulse responses of both the desired and interfering BTS links concurrently to reduce the complexity (i.e., the number of states) in joint maximum likelihood (ML) detection. SAIC algorithms for W-CDMA 3G cellular networks based on successive interference cancellation techniques have been proposed in several publications (for example, Kim, et al., "SAIC Based Iterative Receivers for MC-CDMA Cellular Systems," IEEE Vehicular Technology Conference, p. 1122-1126, 2008, and references therein).

However, unlike previous 2G GSM and 3G W-CDMA, OFDMA suffers from both inter-symbol interference (ISI) and ICI due to lack of orthogonality among the subcarriers. The orthogonality among the subcarriers is lost if channel memory is longer than the guard duration, known as cyclic prefix. It is realized herein that this, in turn, makes channel shortening and effective SAIC a key enabling technology for an LTE or LTE-A downlink.

Coordinated multipoint (CoMP) techniques have been included in the LTE-A standard draft for ICI mitigation. These techniques implement transmit-side ICI coordination or avoidance where certain restrictions are applied on the transmit power and time-frequency resources allocated to users in a cell to improve cell-edge performance in neighboring cells. Examples include fractional power control (see, e.g., Catellanos, et al., "Performance of Uplink Fractional Power Control in UTRAN LTE," pp. 2517-2521, VTC Spring 2008) and soft fractional frequency reuse (see, e.g., Boudreau, et al., "Interference Coordination and Cancellation for 4G Networks," IEEE Communications Magazine, pp. 74-81, April 2009). However, these conventional techniques require extensive information exchange and scheduler coordination between cells which increase signaling overhead and latency and limit the ability of the scheduler in each cell to respond quickly to fast-varying channel fading conditions.

The various OFDMA cellular network ICI mitigation method embodiments described in this Section A provide a robust method to mitigate time asynchronism effects due to the differences in the times of arrival between the desired and interfering signals at the receiver from nearby base stations. They also provide a reduced-complexity near-optimal inter-carrier interference cancellation (ICIC) technique for detecting the desired signal in the presence of one or two dominant ICI sources using a single antenna and RF chain. This reduced-complexity method estimates channels from desired and dominant interfering base stations and enables efficient joint detection to improve LTE network downlink capacity.

1. Model and Assumptions

An example scenario addressed by the methods described in this section, wherein the downlink of an OFDMA system having a single-antenna user terminal 100 receives synchronized signals from three adjacent base stations, is shown in FIG. 1. Of the three adjacent base stations, BTS-1 110 is assumed to be serving user data, whereas BTS-2 120 and BTS-3 130 are interfering with the desired signal. The channel impulse response (CIR) from the $i^{th}$ BTS to the user terminal 100 is denoted by a vector $h_i$ having a length of $(N_b+1)$. A time-asynchronous case where the CIRs can also be of different lengths will be described below. The coherence time of each CIR is assumed to be much greater than the duration of the three OFDMA symbols.

Assuming that a cyclic prefix of length greater than or equal to $N_b$ is appended to each transmitted time-domain OFDMA symbol $x_i$ from BTS-i, the time-domain size-N received OFDMA symbol (after CP removal) is given by:

$$y = H_1^c x_1 + H_2^c x_2 + H_3^c x_3 + z \quad (1)$$
$$= Q * \Lambda_1 Q x_1 + Q * \Lambda_2 Q x_2 + Q * \Lambda_3 Q x_3 + z'$$

where Q is the Fourier transform (FFT) matrix, z is the additive white Gaussian noise (AWGN) vector, $H_i^c$ is the N×N circulant CIR matrix for the link from BTS-i to the user terminal 100, and $\Lambda_i$ is a diagonal matrix the diagonal of which is equal to the FFT of the $i^{th}$ CIR.

The second line in Equation (1) above follows from the fact that FFT diagonalizes the circulant matrices. Taking the FFT of Equation (1) produces the frequency domain equation:

$$Y = Qy = \Lambda_1 X_1 + \Lambda_2 X_2 + \Lambda_3 X_3 + Z, \quad (2)$$

where $X_i = Q x_i$ is the frequency-domain OFDMA symbol from BTS-i. Since $\Lambda_i$ are diagonal matrices, the sub-carriers are decoupled. Therefore, the received signal at the $k^{th}$ sub-carrier ($1 \leq k \leq N$) is given by:

$$Y(k) = \Lambda_1(k,k) X_1(k) + \Lambda_2(k,k) X_2(k) + \Lambda_3(k,k) X_3(k) + Z(k). \quad (3)$$

Defining $H_i(k)$ to be the $k^{th}$ FFT coefficient of the CIR from BTS-i (i=1, 2, 3) to the user terminal 100, i.e., $H_i(k) \equiv \Lambda_i(k,k)$, Equation (3) becomes:

$$Y(k) = H_1(k) X_1(k) + H_2(k) X_2(k) + H_3(k) X_3(k) + Z(k). \quad (4)$$

2. Finite Impulse Response (FIR) Time-Synchronizing and Shortening Pre-Filter (TSSP) Design The input-output model in Equation (4) above assumes that the three base stations BTS-1 110, BTS-2 120, BTS-3 130 are synchronized in time and frequency. The assumption of frequency synchronization is valid due to the use of high-quality frequency oscillators at the base stations BTS-1 110, BTS-2 120, BTS-3 130. However, accurate time synchronization between the received desired and interfering signals cannot be assumed at the user terminal 100 due to the differences in times of arrival. These time synchronization errors cause misalignment between the cyclic prefix time boundaries of the desired and interfering signals, resulting in additional inter-carrier and inter-symbol interferences.

Therefore, in one embodiment, a time-domain FIR pre-filter is implemented at the user terminal (before the FFT is performed) to perform joint time alignment and shortening of the impulse responses of both the desired and ICI channels such that they are time-aligned and their shortened CIR duration is less than the cyclic prefix length. In one specific embodiment, the pre-filter design is a generalization of the pre-filter design in Hoeher, et al., supra, which assumed two synchronous channels to the case of multiple asynchronous channels.

$h_i$ denotes the effective CIR vector of length $(N_f+v)$, which represents the convolution of the original CIR vector $p_i$ of length $(v_i+1)$ and the TSSP vector w of length $N_f$, where v is equal to the maximum of $v_i$ for i=1, 2, 3. Time delays between the desired and ICI channels may be reduced or eliminated by inserting zeros at the beginning of the corresponding CIR vector. Therefore, $h_i = P_i w$, where the $(N_f+v) \times N_f$ Toeplitz convolution matrix $P_i$ is given by:

$$P_i = \begin{bmatrix} p_i(0) & 0 & \cdots & 0 \\ p_i(1) & p_i(0) & \ddots & \vdots \\ \vdots & p_i(1) & \ddots & 0 \\ p_i(v) & \vdots & \ddots & p_i(0) \\ 0 & p_i(v) & \ddots & p_i(1) \\ \vdots & 0 & \ddots & \vdots \\ 0 & 0 & \cdots & p_i(v) \end{bmatrix}.$$

If $h_{win,i}$ denotes a window of $(N_b+1)$ consecutive samples of $h_i$ assuming a common time delay of $\Delta$ samples (where $0 \leq \Delta \leq N_f+v-N_b-1$), and if $h_{wall,i}$ denotes the remaining samples of $h_i$, $h_{win,i}$ and $h_{wall,i}$ can be expressed (using compact notation) as follows:

$$h_{win,i} = [e_{\Delta+1} \cdots e_{\Delta+N_b+1}]^T h_i \equiv E_{win} P_i w \equiv P_{win} w$$

$$h_{wall,i} = [e_1 \cdots e_\Delta e_{\Delta+N_b+2} \cdots e_{N_f+v}]^T$$
$$h_i \equiv E_{wall} P_i w \equiv P_{wall} w' \quad (5)$$

where $(.)^T$ denotes the transpose operation, and $e_i$ is the $i^{th}$ unit column vector (with a one in the $i^{th}$ position and zeros everywhere else) of size $(N_f+v)$.

The TSSP coefficients are computed by maximizing the ratio of the sum of channel energies in $h_{win,i}$ to the sum of channel energies in $h_{wall,i}$ plus the filtered noise energy at the TSSP output.

Mathematically, the following optimization problem:

$$\max_w \sum_{i=1}^{3} h_{win,i}^* h_{win,i} \equiv \max_{w^*} \left( \sum_{i=1}^{3} P_i^* \operatorname{diag}(0_\Delta, 1_{(N_b+1)}, 0_{(N_f+v-N_b-\Delta-1)}) P_i \right) w \quad (6)$$

$$\overset{def}{=} \max_w w^* \left( \sum_{i=1}^{3} P_{win,i}^* P_{win,i} \right) w$$

$$\stackrel{def}{=} \max_{w} w^* B w$$

is to be solved subject to the constraint:

$$\left(\sum_{i=1}^{3} h_{wall,i}^* h_{wall,i}\right) + w^* R_{nn} w = 1, \quad (7)$$

where $(.)^*$ denotes the complex-conjugate transpose operation and $R_{nn}$ is the noise auto-correlation matrix. Using Equation (5), the constraint in Equation (7) can be expressed as follows:

$$\sum_{i=1}^{3} (h_{wall,i}^* h_{wall,i}) + w^* R_{nn} w = \quad (8)$$

$$1 \Leftrightarrow w^* \left(\sum_{i=1}^{3} P_i^* \mathrm{diag}(1_\Delta, 0_{(N_b+1)}, 1_{(N_f+v-N_b-\Delta-1)}) P_i\right) w +$$

$$w^* R_{nn} w = 1 \Leftrightarrow w^* \left(\left(\sum_{i=1}^{3} P_{wall,i}^* P_{wall,i}\right) + R_{nn}\right) w = 1 \Leftrightarrow w^* A w = 1,$$

where $\mathrm{diag}(.)$ denotes a diagonal matrix, $1_m$ is an all-ones vector of size m, $0_n$ is an all-zeros vector of size n, $$B \stackrel{def}{=} \sum_{i=1}^{3} P_i^* \mathrm{diag}(0_\Delta, 1_{(N_b+1)}, 0_{(N_f+v-N_b-\Delta-1)}) P_i \stackrel{def}{=} \sum_{i=1}^{3} P_{win,i}^* P_{win,i}$$

and $$A \stackrel{def}{=} \left(\sum_{i=1}^{3} P_i^* \mathrm{diag}(1_\Delta, 0_{(N_b+1)}, 1_{(N_f+v-N_b-\Delta-1)}) P_i\right) + R_{nn} =$$

$$\left(\sum_{i=1}^{3} P_{wall,i}^* P_{wall,i}\right) + R_{nn},$$

A being a Hermitian positive-definite (and therefore invertible) matrix. To summarize, the described embodiment computes optimum TSSP coefficients by solving the following generalized eigenvector problem (see, e.g., Kay, Fundamentals of Statistical Signal Processing Estimation Theory. Prentice Hall, 1993):

$$\max_{w} w^* B w \text{ subject to } w^* A w = 1. \quad (9)$$

Defining the Cholesky factorization (see, e.g., Golub, et al., "Matrix Computations, Second Edition," The Johns Hopkins University Press, 1989) as $A = LL^*$, where L is a lower-triangular matrix, the optimum TSSP coefficients can be given by $w_{opt} = L^{-*} u_{max}$, where $u_{max}$ is the orthonormal eigenvector of the Hermitian matrix $L^{-1} B L^{-*}$ corresponding to its largest eigenvalue $\lambda_{max}$. The resulting maximum shortening signal-to-noise ratio (SSNR) is given by:

$$SSNR_{max} \stackrel{def}{=} 10 \log\left(\frac{w_{opt}^* B w_{opt}}{w_{opt}^* A w_{opt}}\right) = 10 \log(\lambda_{max}). \quad (10)$$

3. SAIC with Reduced-Complexity Near-ML Technique

The signal constellation size of the $i^{th}$ BTS signal at the $k^{th}$ subcarrier is denoted by $M_{i,k}$. After the frequency responses of the (shortened and time-synchronized) desired and interfering signals are computed, effects arising from interference may then be mitigated by performing joint detection over the three signals $X_i(k)$ for $1 \leq i \leq 3$ using a novel reduced-complexity near-maximum likelihood technique. One embodiment of such technique has the following steps:

(i) Assume without loss of generality that $M_{2,k} \leq M_{3,k}$. Otherwise, the roles of $X_2(k)$ and $X_3(k)$ are interchanged in the following steps (ii) and (iii):

For each of the $M_{1,k} M_{2,k}$ possible combinations of $(X_1(k), X_2(k))$, $$\hat{X}_3(k) = dec\left(\frac{Y(k) - H_1(k) X_1(k) - H_2(k) X_2(k)}{H_3(k)}\right),$$

is computed, where $dec(.)$ denotes a decision device (i.e., slicer) for a size $M_{3,k}$ signal constellation.

(iii) From all $M_{1,k} M_{2,k}$ combinations of $(X_1(k), X_1(k), \hat{X}_3(k))$, computed in step (ii), the one that minimizes $\|Y(k) - H_1(k) X_1(k) - H_2(k) X_2(k) - H_3(k) X_3(k)\|^2$ (the Euclidean distance metric) is chosen.

Figure 2:
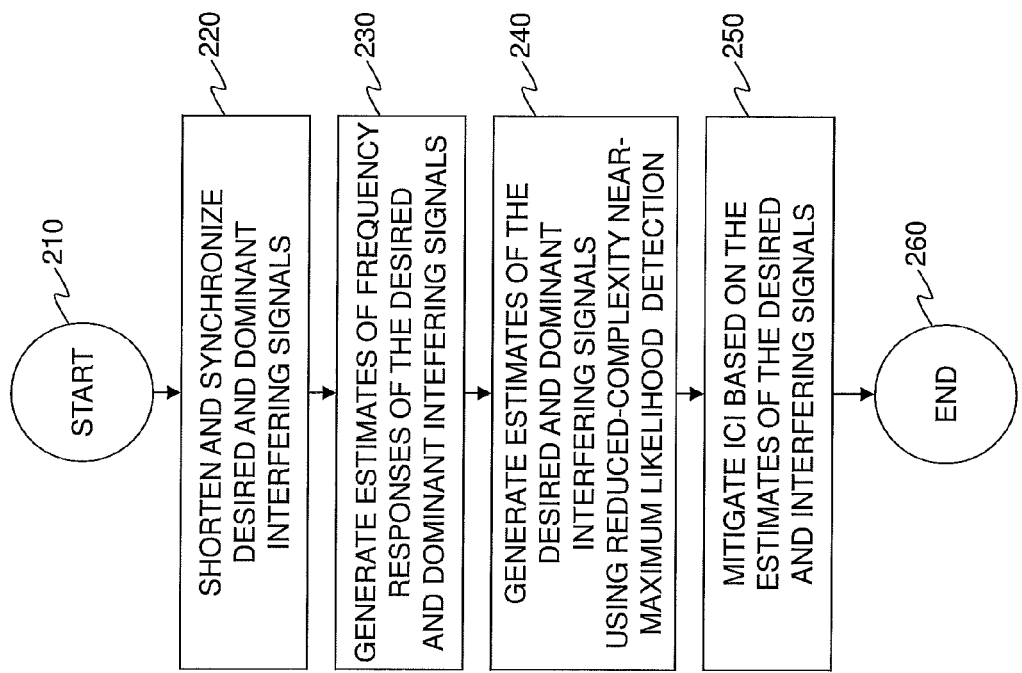
FIG. 2 is a flow diagram of one embodiment of an ICI mitigation method for OFDMA cellular networks and a single receive antenna.

FIG. 2 is a flow diagram of one embodiment of an ICI mitigation method for OFDMA cellular networks and a single receive antenna. The method begins in a start step 210. In a step 220, the desired and dominant interfering signals are shortened and synchronized in time. In a step 230, estimates of the frequency responses of the desired and dominant interfering signals are generated. In a step 240, for each combination of desired and the dominant interfering signal, another dominant interfering signal is estimated using a linear filter. In a step 250, the estimates generated in the step 240 are employed to mitigate ICI. The method ends in an end step 260.

4. SAIC Computational Complexity

Since the user terminal is assumed to be near the cell edge (where ICI is most likely to reduce performance), the signal to interference plus noise (SINR) ratio is small; hence, the assigned signal constellation size is small (most likely a QPSK constellation). Accordingly, the size of the search in step (ii) above will typically be limited to $4M_{2,k}$ possibilities. For LTE-A, this is at most $4 \cdot (64) = 256$ possibilities, which is well within the computational power of state-of-the-art programmable DSPs. In the case of a single dominant interfering base station, the search size is reduced to only $M_{1,k} = 4$ possibilities.

B. Multiple-Receive-Antenna OFDMA Cellular Network ICI Mitigation Method Embodiments Described in this Section B are various method embodiments directed to mitigating synchronous dominant interference from multiple eNBs in an adjacent cell in a cellular system using OFDMA. The method embodiments are implemented at the user terminal and are capable of working with a single receive antenna while being compatible with multiple transmit antennas, multiple receive antennas or both multiple transmit and multiple receive antennas. The embodiments described specifically herein are directed specifically to user terminals having two receive antennas due to the popularity of this antenna architecture for emerging Fourth-Generation (4G) LTE user terminals.

Figure 3:
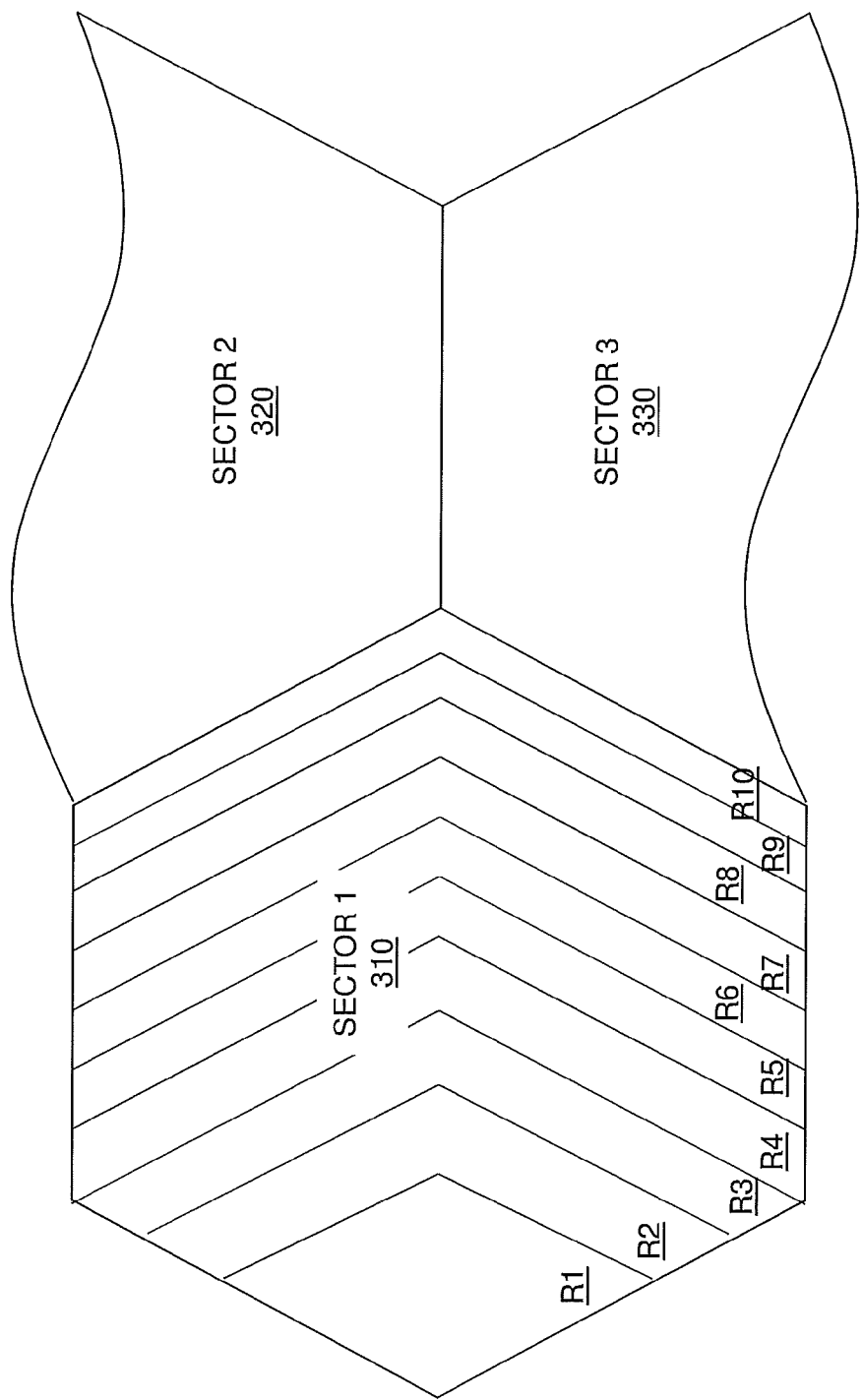
FIG. 3 is a high level schematic of one embodiment of a portion of an OFDMA cellular network illustrating ICI.
Figure 4:
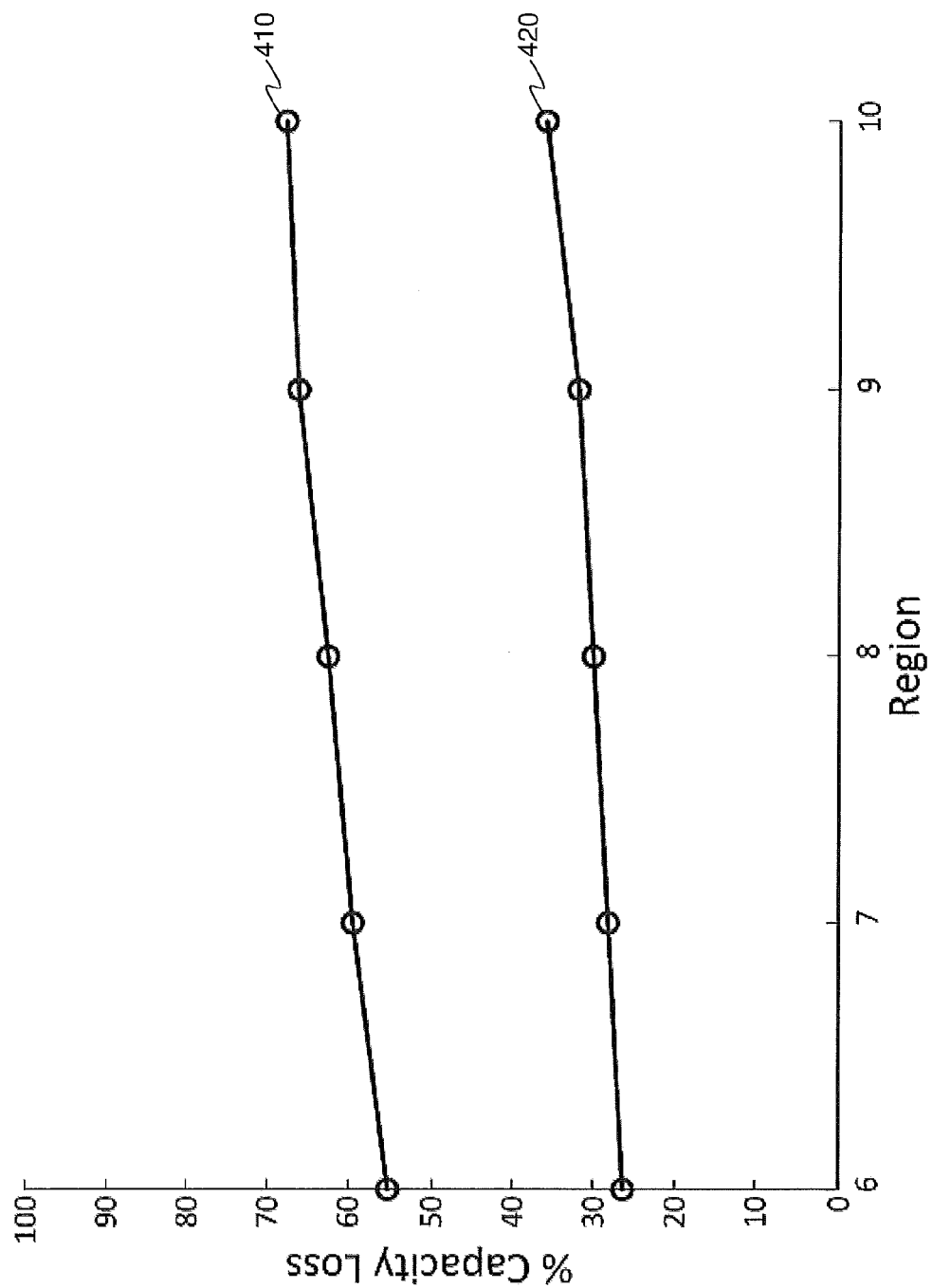
FIG. 4 is a graph illustrating capacity loss due to ICI with and without transmit power control.

ICI from an eNB in an adjacent cell is a performance-limiting impairment for cell-edge users, especially for smaller cells. FIGS. 3 and 4 illustrate this issue. Sector 1 310 is served by a first, serving eNB, sector 2 320 is served by a second eNB, and sector 3 330 is served by a third eNB. Sector 1 310 may be thought of as being subdivided into regions R1-R10, based on distance from sectors 2 and 3 320, 330. In FIG. 4, a first curve 410 shows capacity loss without transmit power control, and a second curve 420 shows capacity lost with transmit power control. FIG. 4 shows that system capacities near the sector 1 310 cell edge (e.g., regions R6 to R10 in FIG. 3) suffer between about 35% and about 65% loss with and without transmit power control, respectively, highlighting the critical need for additional interference mitigation measures in LTE/LTE-A systems. As stated above, the LTE and proposed LTE-A systems employ a frequency re-use factor r of one to provide users with higher spectral efficiency, but at the cost of increased interference.

Fractional power control (see, e.g., Catellanos, et al., supra) and soft fractional frequency reuse (see, e.g., Yu, et al., "Performance Analysis of Soft Frequency Reuse for Inter-cell Interference Coordination in LTE Networks," pp. 504-509, ISICT 2010) implement transmit-side ICI coordination or avoidance where certain restrictions are applied on the transmit power and time-frequency resources allocated to users in a cell to improve cell-edge performance in neighboring cells. Coordinated multipoint (CoMP) techniques were investigated for the LTE-A standard draft for ICI mitigation but finally left out of Release 10 due not only to their high implementation complexity but to the extensive information exchange and scheduler coordination between cells they require, which increases signaling overhead and latency and limits the ability of the scheduler in each cell to respond quickly to fast-varying channel fading conditions. Nonetheless, because ICI remains a serious issue, they are marked as a study item for Release 11.

Introduced are method embodiments involving reduced-complexity near-optimal downlink ICIC in which a desired signal is detected in the presence of multiple dominant ICI sources using multiple (e.g., two) receive antennas at the user terminal. The technique estimates the channel impulse responses (CIRs) from the desired and dominant interfering eNBs and enables efficient joint detection to improve network downlink capacity.

1. Model and Assumptions

The description in this Section B assumes an OFDMA system downlink with two receiver antennas at the user terminal. However, those skilled in the pertinent art will understand that the method embodiments described herein may be readily modified to accommodate user terminals with greater or lesser numbers of antennas.

The antennas receive signals from adjacent sectors (e.g., adjacent eNBs), as shown in FIG. 3. The signals may be synchronous as received or be synchronized by a TSSP. Of the adjacent eNBs, only sector 1 310 (i.e., the first eNB) is transmitting the user data, whereas other eNBs (including sectors 2 and 3 320, 330) are interfering with the desired signal. As shown in FIG. 3, sector 1 310, served by the serving eNB, is divided into ten equal-area subsectors to demonstrate the ICI performance-limiting effects on the receivers at the cell-edge subsectors.

It is assumed that channel knowledge to all eNBs is available at the receiver. It is also assumed that the received signals from the adjacent eNBs are synchronized. The synchronized CIRs from the $i^{th}$ eNB to the $j^{th}$ antenna of the user terminal, denoted by the CIR vector $h_{j,i}$, are further assumed to have a length less than or equal to $(N_b+1)$ and that a cyclic prefix of length greater than or equal to $N_b$ is appended to each transmitted time-domain OFDMA symbol $x_i$ from the $i^{th}$ eNB. Accordingly, the resulting time-domain size-N received OFDMA symbol (after CP removal) at the $j^{th}$ antenna is given by:

$$y_j = H_{j,1}^c x_1 + \sum_{i \neq 1} H_{j,i}^c x_i + z_j = \underbrace{Q^H \Lambda_{j,1} Q x_1}_{desired} + \underbrace{\sum_{i \neq 1} Q^H \Lambda_{j,i} Q x_i}_{interference} + z_j, \quad (11)$$

where Q is the FFT matrix, $z_j$ is an additive white Gaussian noise (AWGN) vector, $H_{j,i}^c$ is the N×N circulant CIR matrix for the link from the $i^{th}$ eNB to the $j^{th}$ antenna of the user terminal, and $\Lambda_{j,i}$ is the corresponding diagonal matrix whose diagonal is equal to the FFT of the $h_{j,i}$. The second line in Equation (11) above follows from the fact that circulant matrices are diagonalized by the FFT. Taking the FFT of Equation (11) yields the frequency domain input-output equation:

$$Y_j = Q y_j = \underbrace{\Lambda_{j,1} X_1}_{desired} + \underbrace{\sum_{i \neq 1} \Lambda_{j,i} X_i}_{interference} + Z_j, \quad (12)$$

where $X_i = Q x_i$ is the frequency-domain OFDMA symbol from the $i^{th}$ eNB. Since $\Lambda_{j,i}$ are diagonal matrices, the subcarriers are decoupled. Therefore, the received signal at the $k^{th}$ subcarrier ($1 \leq k \leq N$) for two receive antennas (j=1,2) is given by:

$$\begin{bmatrix} Y_1(k) \\ Y_2(k) \end{bmatrix} = \begin{bmatrix} \Lambda_{1,1}(k,k) X_1(k) \\ \Lambda_{2,1}(k,k) X_1(k) \end{bmatrix} + \begin{bmatrix} \sum_{i \neq 1} \Lambda_{1,i}(k,k) X_i(k) \\ \sum_{i \neq 1} \Lambda_{2,i}(k,k) X_i(k) \end{bmatrix} + \begin{bmatrix} Z_1(k) \\ Z_2(k) \end{bmatrix}. \quad (13)$$

By defining $H_{j,k}(k)$ to be the $k^{th}$ FFT coefficient of the CIR from the $i^{th}$ eNB to the $j^{th}$ antenna at the user terminal; i.e., $H_{j,k}(k) \equiv \Lambda_{j,i}(k,k)$, Equation (13) becomes:

$$\begin{bmatrix} Y_1(k) \\ Y_2(k) \end{bmatrix} = \begin{bmatrix} H_{1,1}(k) X_1(k) \\ H_{2,1}(k) X_1(k) \end{bmatrix} + \begin{bmatrix} \sum_{i \neq 1} H_{1,i}(k,k) X_i(k) \\ \sum_{i \neq 1} H_{2,i}(k,k) X_i(k) \end{bmatrix} + \begin{bmatrix} Z_1(k) \\ Z_2(k) \end{bmatrix}. \quad (14)$$

2. Effect of Dominant Interferes

Figure 5:
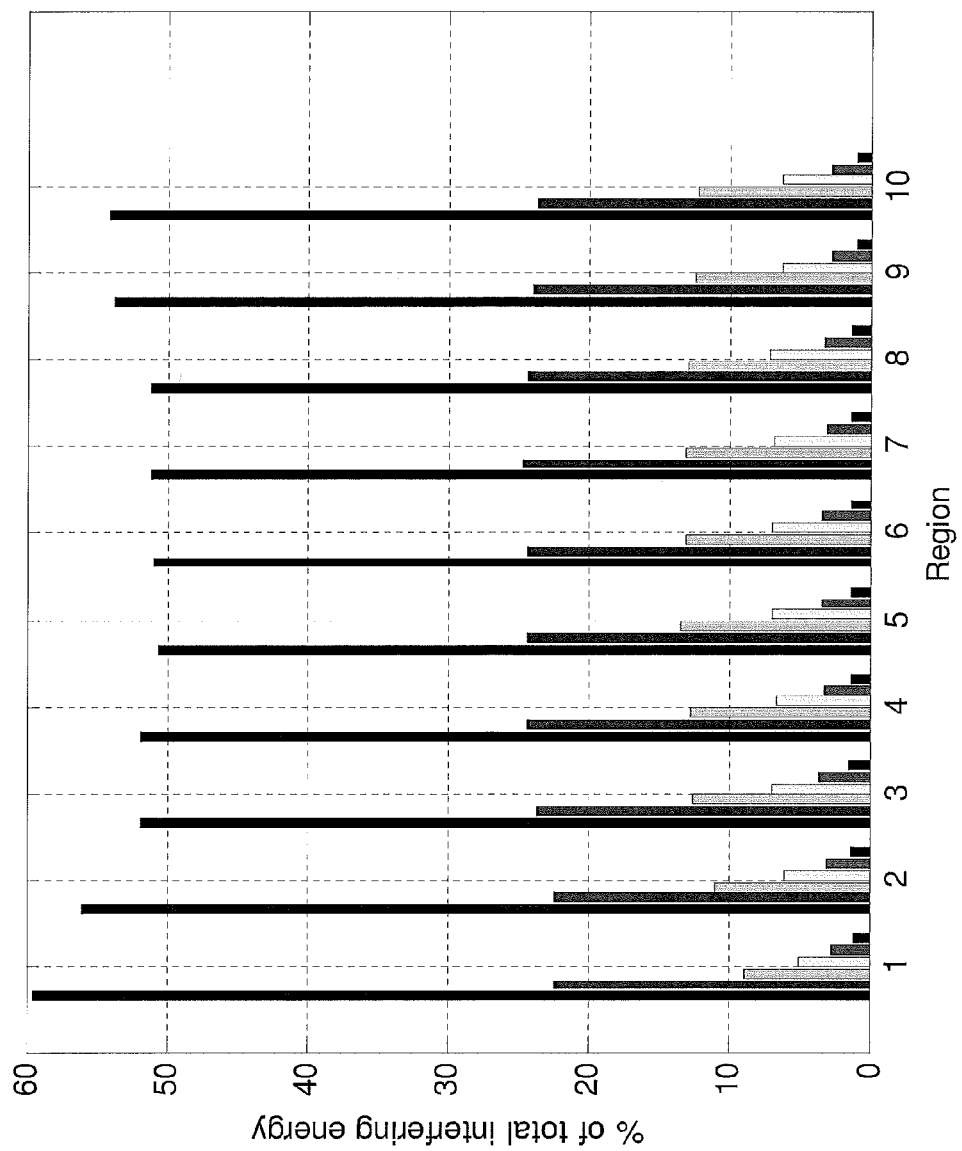
FIG. 5 is a graph comparing the energy of individual interfering eNBs in descending order to the total interfering energy of the interfering eNBs.

Although the desired received signal is perturbed by various adjacent interfering eNBs, the severity of each interfering eNB varies depending on the receiver location in the desired sector, transmit power and antenna orientation of the eNBs, among other factors. FIG. 5 is a graph comparing the energy of six interfering eNBs in descending order to the total interfering energy of the interfering eNBs. FIG. 5 depicts the contribution of each interfering signal to the total interference energy for the system layout shown in FIG. 3 where all eNBs transmit at their full allowable transmit power of 46 dBm and therefore demonstrates a typical capacity loss in the cell edge of a seven-cell system layout. It is evident that, for such representative scenario, the most dominant interfering signal contributes about 55% of the total interference energy, while the two most dominant interfering signals contribute a total of about 75%. Therefore, mitigating the two most dominant interfering signals should be sufficient to improve the cell performance significantly, especially at the cell-edge. Accordingly, the method embodiments specifically described in this Section B are designed to mitigate the two most-dominant interfering signals using only two receive antennas at the user terminal. It is realized that this is the most popular scenario in practice. However, those skilled in the pertinent art will realize that the specific method embodiments may be modified to address circumstances in which the number of dominant interfering signals is not two or does not equal the number of receive antennas at the user terminal.

If i=2,3 denotes the index of the two most dominant interfering eNBs to the desired user signal, Equation (14) can be modified by aggregating the signals of the other less significant interfering eNBs with the noise as follows:

$$\underbrace{\begin{bmatrix} Y_1(k) \\ Y_2(k) \end{bmatrix}}_{Y(k)} = \underbrace{\begin{bmatrix} H_{1,1}(k) & H_{1,2}(k) & H_{1,3}(k) \\ H_{2,1}(k) & H_{2,2}(k) & H_{2,3}(k) \end{bmatrix}}_{H(k)} \underbrace{\begin{bmatrix} X_1(k) \\ X_2(k) \\ X_3(k) \end{bmatrix}}_{X(k)} + \underbrace{\begin{bmatrix} \tilde{Z}_1(k) \\ \tilde{Z}_2(k) \end{bmatrix}}_{\tilde{Z}(k)}. \quad (15)$$

$$Y(k) = H(k)X(k) + \tilde{Z}(k)$$

3. Dual Antenna ICI Cancellation (DAIC)

Assuming that knowledge of the signal constellation size for all dominant eNBs are available at the receiver, let $M_{i,k}$ denote the size of the signal constellation from the $i^{th}$ eNB at the $k^{th}$ subcarrier. After the frequency responses of the (shortened and time-synchronized) desired and ICI channels are computed, the ICI effects are mitigated by performing joint detection over the three signals $X_i(k)$ for i=1, 2, 3 using reduced-complexity near-ML detection (RC-NMLD). Two RC-NMLD embodiments will now be presented.

According to the first embodiment, ML detection is performed on the desired signal, and linear zero-force (ZF) detection is performed on the two most dominant interfering signals, as described mathematically below.

(i) For each of the $M_{1,k}$ choices, $$\begin{bmatrix} \hat{X}_2(k) \\ \hat{X}_3(k) \end{bmatrix} = dec(H_{2,3}^{-1}(Y(k) - H_1(k)X_1(k))) \quad (16)$$

is computed, where $$H_1(k) \stackrel{def}{=} \begin{bmatrix} H_{1,1}(k) \\ H_{2,1}(k) \end{bmatrix},$$

$$H_{2,3}(k) \stackrel{def}{=} \begin{bmatrix} H_{1,2}(k) & H_{1,3}(k) \\ H_{2,2}(k) & H_{2,3}(k) \end{bmatrix}$$

and dec(.) denotes the decision device (i.e., slicer) for a size $M_{2,k}$ and $M_{3,k}$ signal constellations corresponding to $X_2(k)$ and $X_3(k)$, respectively.

(ii) From the $M_{1,k}$ combinations of the triplet $(X_1(k),\hat{X}_2(k),\hat{X}_3(k))$ computed in the previous step, the one that minimizes the following Euclidean distance metric:

$$\|Y(k)-H(k)X(k)\|^2 \quad (17)$$

is chosen.

(iii) In presence of $N_{int}$ ($N_{int}>2$) dominant interfering eNBs in the system, an ML search is performed on ($N_{int}-1$) eNBs' signal constellations (one desired, ($N_{int}-2$) interfering), and the estimate of the two interfering signals is computed according to step (i). Next, the cost function of step (ii) for $$\left( \prod_{i=1}^{N_{int}-1} M_{i,k} \right)$$

combinations is minimized.

Figure 6:
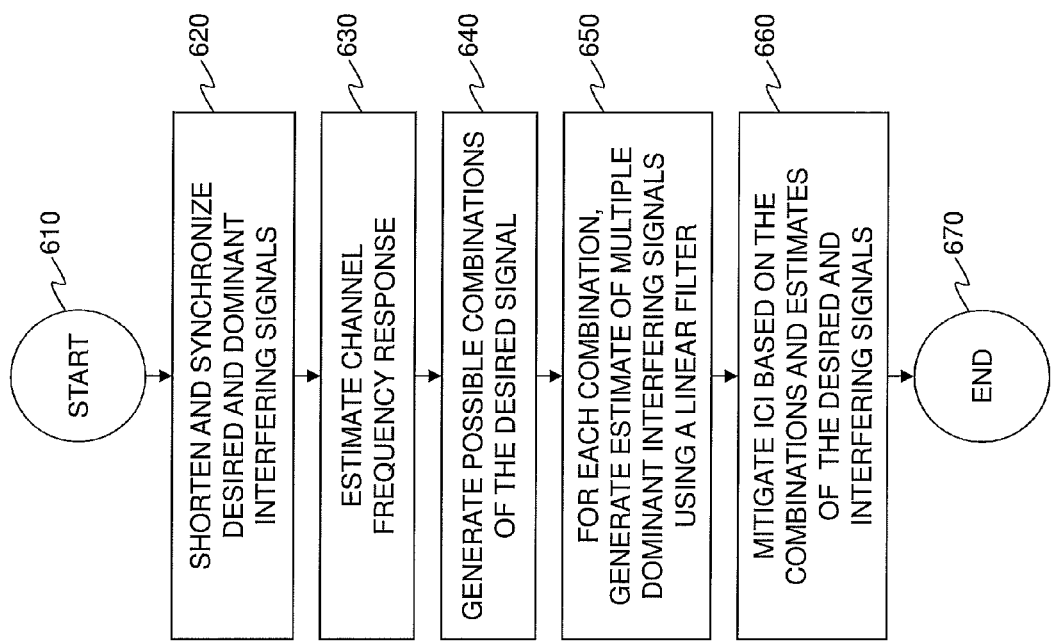
FIG. 6 is a flow diagram of a first embodiment of an ICI mitigation method for OFDMA cellular networks and dual receive antennas.

FIG. 6 is a flow diagram of a first embodiment of an ICI mitigation method for OFDMA cellular networks and dual receive antennas. The method begins in a start step 610. In a step 620, the desired and dominant interfering signals are shortened and synchronized in time. In a step 630, CFR is estimated. In a step 640, possible combinations of the desired signal are generated. In a step 650, for each combination of the desired signal estimates of the multiple dominant interfering signals are generated using a linear filter, (e.g., linear ZF detection). In a step 660, ICI is mitigated based on the possible combinations and estimates of the desired and multiple dominant interfering signals. The method ends in an end step 670.

According to the second embodiment, joint ML detection is performed on the desired signal and only one of the dominant interfering signals (e.g., the one with the smaller signal constellation size to reduce the ML search complexity). Then maximal-ratio combining (MRC) detection is employed on the other dominant interfering signal, as described mathematically below:

(i) For all of the $M_{1,k} M_{2,k}$ choices in the ML search, $$\hat{X}_3(k) = dec\left( \frac{H_3(k)^H \left( Y(k) - H_{1,2}(k) \begin{bmatrix} X_1(k) \\ X_2(k) \end{bmatrix} \right)}{H_3(k)^H H_3(k)} \right) \quad (18)$$

is computed, where $$H_3(k) \stackrel{def}{=} \begin{bmatrix} H_{3,1}(k) \\ H_{3,2}(k) \end{bmatrix},$$

$$H_{1,2}(k) \stackrel{def}{=} \begin{bmatrix} H_{1,1}(k) & H_{1,2}(k) \\ H_{2,1}(k) & H_{2,2}(k) \end{bmatrix},$$

and dec(.) denotes the decision device for a size $M_{3,k}$ signal constellation corresponding to $X_3(k)$.

(ii) From the $M_{1,k} M_{2,k}$ possible choices of the triplet $(X_1(k),\hat{X}_2(k),\hat{X}_3(k))$ computed in the previous step, the one which minimizes the Euclidean distance metric:

$$\|Y(k)-H(k)X(k)\|^2 \quad (19)$$

is chosen.

(iii) In the presence of $N_{int}$ ($N_{int}>2$) dominant interfering eNBs in the system, an ML search is performed on $N_{int}$ eNBs' signal constellations (one desired, ($N_{int}-1$) interfering), and the MRC estimate of the remaining interfering signal is computed according to step (i). Next, the cost function of step (ii) for $$\left(\prod_{i=1}^{N_{int}} M_{i,k}\right)$$

combinations is minimized.

Figure 7:
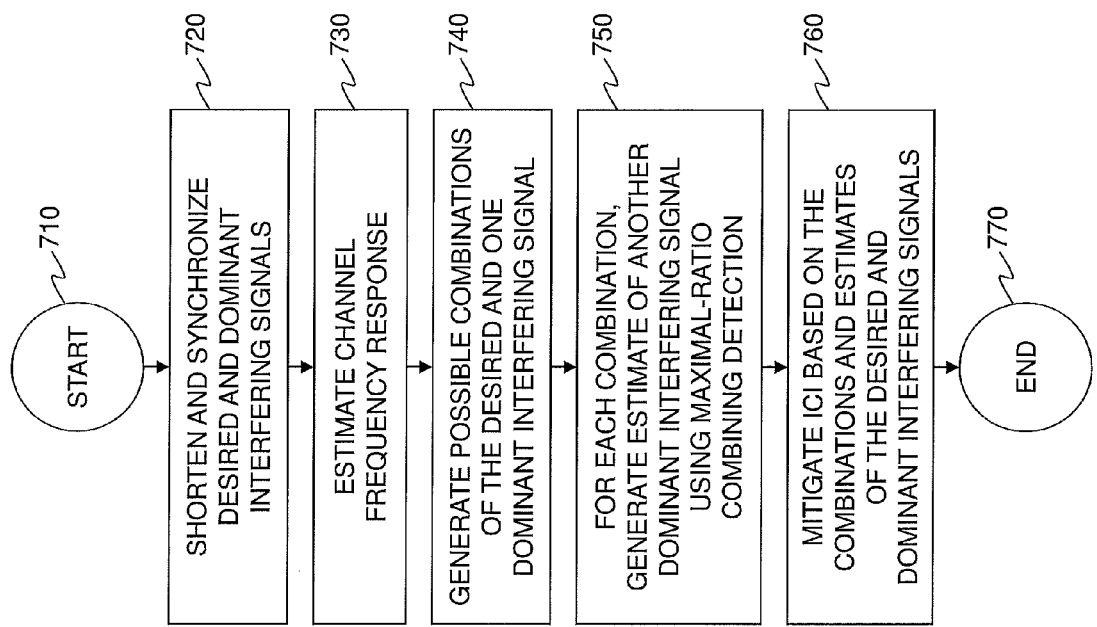
FIG. 7 is a flow diagram of a second embodiment of an ICI mitigation method for OFDMA cellular networks and dual receive antennas.

FIG. 7 is a flow diagram of a second embodiment of an ICI mitigation method for OFDMA cellular networks and dual receive antennas. The method begins in a start step 710. In a step 720, the desired and dominant interfering signals are shortened and synchronized in time. In a step 730, CFR is estimated. In a step 740, possible combinations of the desired signal and one dominant interfering signal are generated. In a step 750, for each combination of desired signal and one dominant interfering signal, an estimate of another dominant interfering signal is generated by performing MRC detection. In a step 760, ICI is mitigated based on the possible combinations and estimates of the desired and multiple dominant interfering signals. The method ends in an end step 770.

As noted in Section A above, since the user terminal is assumed to be near the cell edge (where ICI effects dominate performance), its SINR is small; hence, the assigned signal constellation size is typically small (most likely a QPSK constellation). Again, the ML search size is likely to be at most 4·(64)=256 possibilities, which is well within the computational power of state-of-the-art programmable DSPs.

In addition to these two embodiments, reduced-complexity RC-NMLD can be modified for the case in which the interfering signals' constellations are unknown at the receiver. Since LTE/LTE-A uses only three signal constellations, based on the received signal, the decision on $X_2(k)$ and/or $X_3(k)$ is given by the nearest constellation points of these three signal constellations. The nearest signal constellation points can be determined in a step-by-step fashion by moving from the lower-order signal constellation to the higher-order signal constellation. This can be visualized as "zooming" into the signal constellation until the cost function in Step (ii) is minimized. As an alternative, the nearest constellation points for all three signal constellations can be computed in concurrently to reduce the processing delay.

4. RC-NMLD Computational Complexity

RC-NMLD's computational complexity, assuming the availability of channel knowledge at the receiver and synchronous received signals from the desired and all dominant eNBs, will now be evaluated per subcarrier. In the illustrated embodiment, full ML joint detection of the desired signal and the two most-dominant interfering signals requires 15 complex operations for each of the $M_{1,k} M_{2,k} M_{3,k}$ possibilities followed by a comparator. In contrast, the first embodiment of this invention requires $M_{1,k} (2M_{2,k}+2M_{3,k}+32)$ complex operations and $2M_{1,k}+1$ comparisons for $M_{1,k}$ choices. On the other hand, the second embodiment requires $M_{1,k} M_{2,k} (2M_{3,k}+15)$ complex operations and $M_{1,k} M_{2,k}+1$ comparisons for $M_{1,k} M_{2,k}$ possibilities. Table 1, below, compares the total number of complex operations required for each subcarrier for full ML detection and the two DIAC embodiments described above. Without loss of generality, the desired signal constellation is assumed to be QPSK for the cell-edge users. Table 1 demonstrates a significant reduction in computational complexity compared to full ML detection, especially when the two dominant interfering signals are drawn from higher-order signal constellations.

TABLE 1

Comparison of Complex Operations per Subcarrier

| Dominant Interfering Signal Constellation Size | Full ML Complex Ops | First Embodiment Complex Ops | First Embodiment Reduc. (%) | Second Embodiment Complex Ops | Second Embodiment Reduc. (%) |
|---|---|---|---|---|---|
| $M_{2,k} = M_{3,k} = 4$ | 960 | 192 | 80.0 | 368 | 61.7 |
| $M_{2,k} = M_{3,k} = 16$ | 15,360 | 384 | 97.5 | 3008 | 80.4 |
| $M_{2,k} = M_{3,k} = 64$ | 245,760 | 1152 | 99.5 | 36,608 | 85.1 |

C. Multiple-Transmit-Multiple-Receive-Antenna OFDMA Cellular Network ICI Mitigation Method Embodiments Described in this Section C are various method embodiments directed to canceling synchronous dominant interference signals from multiple eNBs, each equipped with multiple transmit antennas, in adjacent cells on the downlink of a cellular system using OFDMA. As with the embodiments described above, the method embodiments described herein are intended to be implemented at the user terminal, which is assumed to have two or more receive antennas. The embodiments specifically described correspond to the three multiple-transmit-antenna modes adopted in the LTE-A standard and described above: namely, the above-described beamforming (or precoding), spatial multiplexing and spatial diversity modes. A fourth, hybrid MIMO mode will also be described.

Existing ICIC methods are based on MMSE joint decoding, which requires the number of receive antennas to be greater than or equal to the number of transmit antennas to achieve satisfactory performance (see, e.g., Verdu, "Multiuser Detection," Cambridge University Press, 1998). For example, the conventional MMSE joint decoding technique cannot estimate ICI reliably when the desired eNB and the user terminal each have two antennas. Instead, a conventional MMSE method is used which aggregates ICI with thermal noise. Unfortunately, this aggregation results in performance degradation. The ICIC methods introduced herein do not suffer from this limitation.

In general, the reduced-complexity method estimates the channel impulse responses (CIRs) from the desired and dominant interfering eNBs and enables efficient joint estimation to improve the network downlink capacity. Particularly detailed herein are various embodiments of a reduced-complexity near-optimal downlink ICIC method for detecting the desired signal in the presence of one or two synchronous dominant interfering signals, each with two transmit antennas, using two receive antennas at the user terminal. However, those skilled in the pertinent art will readily be able to modify the methods introduced herein to accommodate larger numbers of interfering signals, transmit or receive antennas.

1. Model and Assumptions

For purposes of the following discussion, an OFDMA system downlink with two receiver antennas at the user terminal is considered, which receives synchronized signals from M adjacent eNBs, each equipped with two transmit antennas. Of the M adjacent eNBs, only eNB #1 is transmitting the desired user data, whereas the other eNBs are interfering with the desired signal. Moreover, in practice, most of the ICI is due to one or two dominant interfering eNBs. Furthermore, it is assumed that knowledge of the channel to all dominant interfering eNBs is available at the receiver and that the received signals from the adjacent dominant eNBs are synchronized.

The synchronized CIRs from the $i^{th}$ transmit antenna of the $k^{th}$ eNB to the $j^{th}$ receive antenna at the user terminal, denoted by the CIR vector $h_{i,j}^{(k)}$, are assumed to have a length less than or equal to $N_b+1$. A cyclic prefix of length greater than or equal to $N_b$ is appended to each transmitted time-domain OFDMA symbol $x_k$ from the $k^{th}$ eNB. Therefore, the subcarriers are decoupled and we can decode the signals on a per-subcarrier basis without performance loss.

For any frequency subcarrier, the frequency-domain input-output model at the two receive antennas (omitting the subcarrier index to simplify notation) is given by:

$$\begin{bmatrix} Y_1 \\ Y_2 \end{bmatrix} = \sum_{k=1}^{3} \underbrace{\begin{bmatrix} H_{1,1}^{(k)} & H_{1,2}^{(k)} \\ H_{2,1}^{(k)} & H_{1,1}^{(k)} \end{bmatrix}}_{H^{(k)}} \begin{bmatrix} X_1^{(k)} \\ X_2^{(k)} \end{bmatrix} + \begin{bmatrix} Z_1 \\ Z_2 \end{bmatrix}, \quad (20)$$

where the first term in the sum (k=1) corresponds to the signal from the desired eNB, and the second and third terms (k=2,3) correspond to interfering signals from the two dominant eNBs. Other (weaker) interfering signals are aggregated with the noise signals $Z_1$ and $Z_2$. The notation $H_{j,i}^{(k)}$ refers to the complex channel frequency response (CFR) coefficient from the $i^{th}$ transmit antenna of the $k^{th}$ eNB to the $j^{th}$ receive antenna.

2. Reduced-Complexity RC-NMLD Joint Estimation Assumptions

It is assumed that knowledge of the signal constellation size for all dominant eNBs is available at the user terminal either through a control channel, an estimation process, or by searching over all possible choices. For example, in the LTE downlink, only three possible signal constellations exist: QPSK, 16-QAM, and 64-QAM. $M_k$ denotes the size of the signal constellation from the $k^{th}$ eNB. After the CFR coefficients of the (possibly shortened and synchronized) desired and dominant interfering signals are computed, the ICI effects are mitigated by performing joint estimation over the desired and dominant one or two interfering signals using one of the four RC-NMLD embodiments described in the next four subsections.

Spatial Beamforming/Precoding Mode Embodiment

In the spatial beamforming/precoding mode embodiment, estimates of the transmitted signals $X_1^{(k)}$ and $X_2^{(k)}$ from the first and second transmit antenna, respectively, of the $k^{th}$ eNB are generated by multiplying an information symbol $S^{(k)}$ by the beamformer vector $$w^{(k)} = \begin{bmatrix} w_1^{(k)} \\ w_2^{(k)} \end{bmatrix}.$$

Receiver knowledge of the beamformer coefficients of all the desired and dominant interfering signals is assumed, allowing Equation (20) to take the form:

$$\begin{bmatrix} Y_1 \\ Y_2 \end{bmatrix} = \sum_{k=1}^{3} H^{(k)} w^{(k)} S^{(k)} + \begin{bmatrix} Z_1 \\ Z_2 \end{bmatrix} \quad (21)$$

$$= H^{(1)} w^{(1)} S^{(1)} + [H^{(2)} w^{(2)} \quad H^{(3)} w^{(3)}] \begin{bmatrix} S^{(2)} \\ S^{(3)} \end{bmatrix} + \begin{bmatrix} Z_1 \\ Z_2 \end{bmatrix},$$

$$\rightarrow Y \stackrel{def}{=} H_{eqv} S + Z$$

where the equivalent channel matrix $H_{eqv}$ and the overall signal vector are defined as follows:

$$H_{eqv} = [H^{(1)} w^{(1)} \quad H^{(2)} w^{(2)} \quad H^{(3)} w^{(3)}] \text{ and}$$

$$S = \begin{bmatrix} S^{(1)} \\ S^{(2)} \\ S^{(3)} \end{bmatrix}.$$

Then, joint RC-NMLD calls for ML estimation to be performed on the desired signal $S^{(1)}$. This involves a search of size $M_1$ and linear ZF estimation on the two most dominant interfering signals $S^{(2)}$ and $S^{(3)}$, as described mathematically below.

(i) For each of the $M_1$ choices of $S^{(1)}$, $$\begin{bmatrix} \hat{S}^{(2)} \\ \hat{S}^{(3)} \end{bmatrix} = dec\left([H^{(2)} w^{(2)} \quad H^{(3)} w^{(3)}]^{-1}\left(\begin{bmatrix} Y_1 \\ Y_2 \end{bmatrix} - H^{(1)} w^{(1)} S^{(1)}\right)\right), \quad (22)$$

is computed, where dec(.) denotes the decision device (i.e., slicer) for a size $M_2$ and $M_3$ signal constellations corresponding to $S^{(2)}$ and $S^{(3)}$, respectively.

(ii) From the $M_1$ combinations of $(S^{(1)}, \hat{S}^{(2)}, \hat{S}^{(3)})$ computed in step (i), the one that minimized the Euclidean distance metric $\|Y - H_{eqv} S\|^2$ is chosen.

(iii) In the presence of $N_{int}$ ($N_{int}>2$) dominant interfering eNBs, an ML search is performed on $(N_{int}-1)$ eNBs' signal constellations (one desired, $(N_{int}-2)$ interfering) and the two interfering signals are estimated according to step (i) above. Finally, the cost function of step (ii) is minimized above over all $$\left(\sum_{i=1}^{N_{int}-1} M_i\right)$$

combinations.

Figure 8:
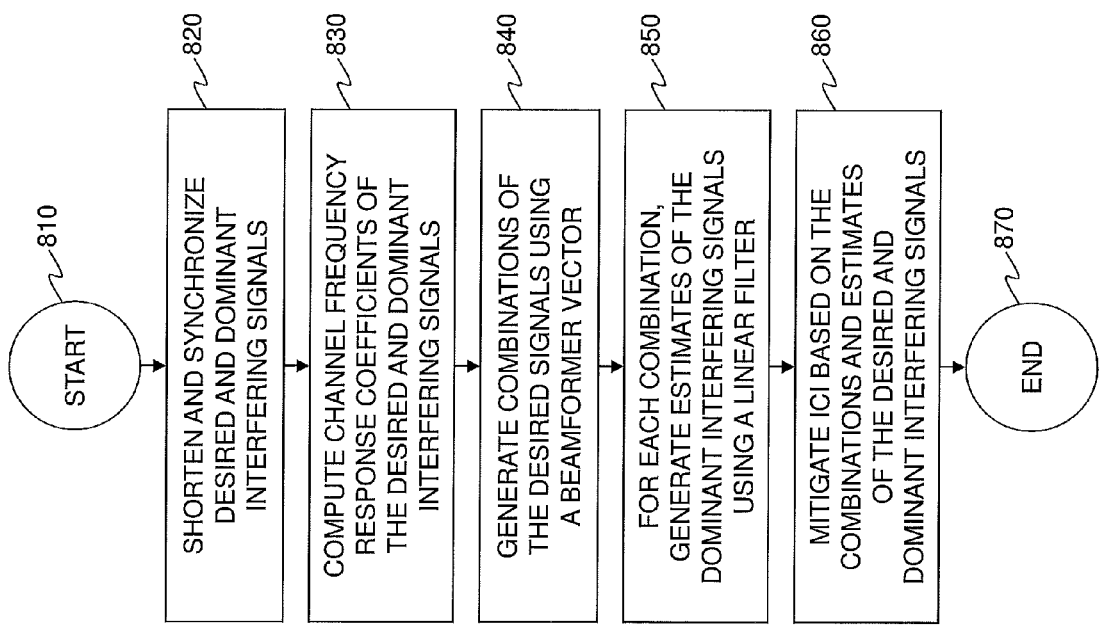
FIG. 8 is a flow diagram of a first embodiment of an ICI mitigation method for OFDMA cellular networks operating in a spatial beamforming mode with multiple transmit and receive antennas.

FIG. 8 is a flow diagram of a first embodiment of an ICI mitigation method for OFDMA cellular networks operating in a spatial beamforming mode with multiple transmit and receive antennas. The method begins in a start step 810. In a step 820, the desired and dominant interfering signals are shortened and synchronized. In a step 830, CFR coefficients are computed for the desired and dominant interfering signals. In a step 840, possible combinations of the desired signals are generated using a beamformer vector. In a step 850, for each combination of the desired signal using a beamformer vector, estimates of the dominant interfering signals are estimated using a linear filter. In a step 860, ICI is mitigated based on the combinations and estimates of the desired and dominant interfering signals. The method ends in an end step 870.

Spatial Multiplexing Mode Embodiment

In the spatial multiplexing mode, the signals transmitted from the transmitter antennas are independent (see, e.g., Foschini, supra). As an illustration, assuming two transmitter antennas at the desired and two dominant interfering eNBs, six signals should be jointly estimated using only two receiver antennas, as shown below:

$$\begin{bmatrix} Y_1 \\ Y_2 \end{bmatrix} = \underbrace{\begin{bmatrix} H_{1,1}^{(1)} & H_{1,2}^{(1)} & H_{1,1}^{(2)} & H_{1,2}^{(2)} \\ H_{2,1}^{(1)} & H_{2,2}^{(1)} & H_{2,1}^{(2)} & H_{2,2}^{(2)} \end{bmatrix}}_{H^{(1,2)}} \begin{bmatrix} X_1^{(1)} \\ X_2^{(1)} \\ X_1^{(2)} \\ X_2^{(2)} \end{bmatrix} + \underbrace{\begin{bmatrix} H_{1,1}^{(3)} & H_{1,2}^{(3)} \\ H_{2,1}^{(3)} & H_{2,2}^{(3)} \end{bmatrix}}_{H^{(3)}} \begin{bmatrix} X_1^{(3)} \\ X_2^{(3)} \end{bmatrix} + \begin{bmatrix} Z_1 \\ Z_2 \end{bmatrix}. \quad (23)$$

Accordingly, in the spatial multiplexing mode embodiment, joint estimation using RC-NMLD proceeds as follows. The four signals from the desired eNB and the first dominant interfering eNB are jointly estimated using an ML search of size $M_1^2 M_2^2$. Then, for each of these choices, the two signals from the second dominant interfering eNB are estimated using the following simple linear ZF equalizer:

$$\begin{bmatrix} \hat{X}_1^{(3)} \\ \hat{X}_2^{(3)} \end{bmatrix} = dec\left((H^{(3)})^{-1}\left(\begin{bmatrix} Y_1 \\ Y_2 \end{bmatrix} - H^{(1,2)}\begin{bmatrix} X_1^{(1)} \\ X_2^{(1)} \\ X_1^{(2)} \\ X_2^{(2)} \end{bmatrix}\right)\right). \quad (24)$$

Finally, the six signals that minimize the Euclidean norm of the noise vector in Equation (23) are selected.

Figure 9:
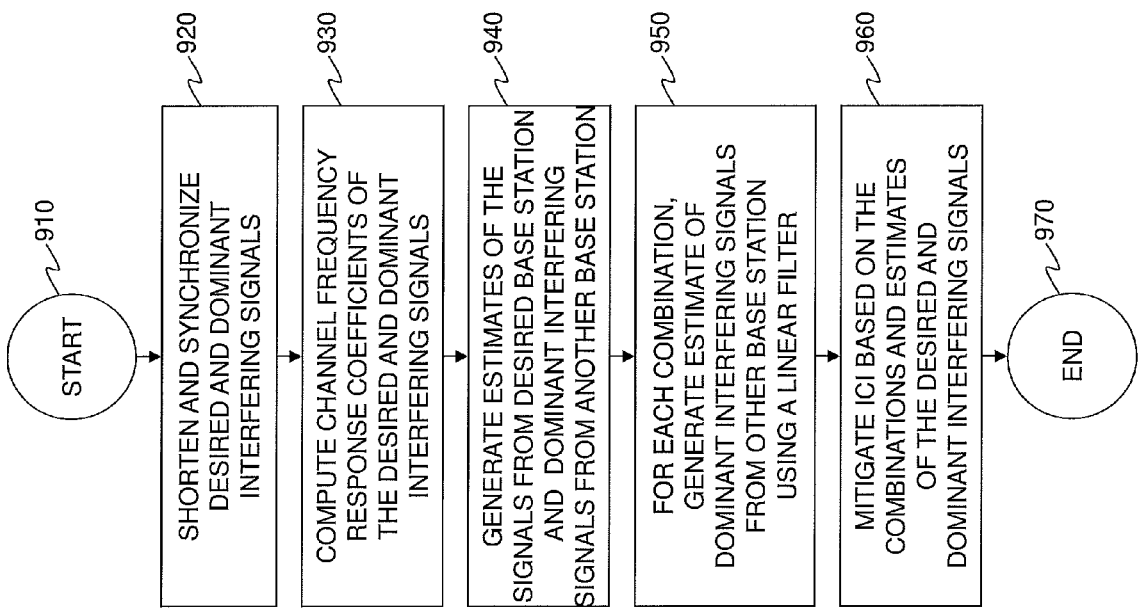
FIG. 9 is a flow diagram of a second embodiment of an ICI mitigation method for OFDMA cellular networks operating in a spatial multiplexing mode with multiple transmit and receive antennas.

FIG. 9 is a flow diagram of a second embodiment of an ICI mitigation method for OFDMA cellular networks operating in a spatial multiplexing mode with multiple transmit and receive antennas. The method begins in a start step 910. In a step 920, the desired and dominant interfering signals are shortened and synchronized. In a step 930, CFR coefficients are computed for the desired and dominant interfering signals. In a step 940, possible combinations of the signals from the desired BTS and dominant interfering signals from another BTS are generated. In a step 950, for each combination of the desired and dominant interfering signals from the other BTS, an estimate of the dominant interfering signals from the other BTS is generated using a linear filter. In a step 960, ICI is mitigated based on the possible combinations and estimates of the desired and dominant interfering signals. The method ends in an end step 970.

Spatial Diversity Mode Embodiment

In the spatial diversity mode, the information symbols are first encoded by an STBC or an SFBC to generate multiple correlated signals; one for each transmit antenna. At each eNB, the transmit antennas are spaced wide enough (typically more than a wavelength) to guarantee independent fading of the channels between each transmit antenna and the user terminal. Hence, even if one of the channels is fading badly, the other channels are highly unlikely to be fading badly also. The correlation between the transmitted signals enables the user terminal to decode the information symbols reliably resulting in a so-called "spatial diversity gain."

RC-NMLD will be adapted to these spatial scenarios. The technique for the most popular transmit spatial diversity scenario for LTE or LTE-A will be presented for purposes of illustration. That technique is the Alamouti SFBC (see, e.g., Alamouti, "A Simple Transmit Diversity Technique for Wireless Communications," IEEE Journal on Selected Areas in Communications, vol. 16, no. 8, pp. 1451-1458, October 1998) for two transmit antennas at each eNB. Those skilled in the pertinent art will readily be able to modify the embodiments described herein to adapt them to other SFBCs, such as orthogonal designs for more than two transmit antennas and to STBCs for two or more transmit antennas.

According to the Alamouti SFBC scheme, each pair of information symbols $X_1^{(j)}$ and $X_2^{(j)}$ from the $j^{th}$ eNB is encoded into four correlated symbols $$\begin{bmatrix} X_1^{(j)} & X_2^{(j)} \\ -X_2^{*(j)} & X_1^{*(j)} \end{bmatrix},$$

which are transmitted over two adjacent subcarriers from both transmit antennas concurrently. The 2×2 SFBC matrix is orthogonal, enabling this SFBC to achieve full spatial diversity gain at reduced ML decoding complexity.

Assuming two dominant interfering signals and two receive antennas at the user terminal, the input-output relationship over each pair of adjacent SFBC subcarriers has the form:

$$\begin{bmatrix} Y_{1,1} \\ Y_{2,1}^* \\ Y_{1,2} \\ Y_{2,2}^* \end{bmatrix} = \sum_{j=1}^{3} \begin{bmatrix} H_{1,1}^{(j)} & H_{1,2}^{(j)} \\ H_{1,2}^{*(j)} & -H_{1,1}^{*(j)} \\ H_{2,1}^{(j)} & H_{2,2}^{(j)} \\ H_{2,2}^{*(j)} & -H_{2,1}^{*(j)} \end{bmatrix} \begin{bmatrix} X_1^{(j)} \\ X_2^{(j)} \end{bmatrix} + Z \quad (25)$$

$$\stackrel{def}{=} \begin{bmatrix} H_1^{(1)} \\ H_2^{(1)} \end{bmatrix} \begin{bmatrix} X_1^{(1)} \\ X_2^{(1)} \end{bmatrix} + \begin{bmatrix} H_1^{(2)} & H_1^{(3)} \\ H_2^{(2)} & H_2^{(3)} \end{bmatrix} \begin{bmatrix} X_1^{(2)} \\ X_2^{(2)} \\ X_1^{(3)} \\ X_2^{(3)} \end{bmatrix} + Z,$$

where all of the 2×2 channel matrices $H_i^{(j)}$ (for i=1,2 and j=1, 2, 3) have the Alamouti-type orthogonal structure, and Z is the 4×1 noise-plus-residual-interference vector.

To apply RC-NMLD to the system model in Equation (25), a full ML search of size $M_1^2$ is performed over the two symbols $X_1^{(1)}$ and $X_2^{(1)}$ from the desired eNB. Then, for each of these $M_1^2$ choices, the four symbols from the two dominant interfering eNBs are estimated using the following simple linear ZF equalizer:

$$\begin{bmatrix} \hat{X}_1^{(2)} \\ \hat{X}_2^{(2)} \\ \hat{X}_1^{(3)} \\ \hat{X}_2^{(3)} \end{bmatrix} = dec\left(\left(\begin{bmatrix} H_1^{(2)} & H_1^{(3)} \\ H_2^{(2)} & H_2^{(3)} \end{bmatrix}\right)^{-1} \left(Y - \begin{bmatrix} H_1^{(1)} \\ H_2^{(1)} \end{bmatrix}\begin{bmatrix} X_1^{(1)} \\ X_2^{(1)} \end{bmatrix}\right)\right) \quad (26)$$

As noted above, since the user terminal is assumed to be near the cell edge (where ICI effects dominate performance), its SINR is small. Hence, the assigned signal constellation size is typically small (most likely a QPSK constellation). This observation asserts that the size of the ML search $M_1^2$ will be typically limited to only 16 choices. Moreover, the complexity of the 4×4 matrix inversion in Equation (26) can be significantly reduced by exploiting the orthogonal structure of each of the four 2×2 constituent sub-matrices.

Figure 10:
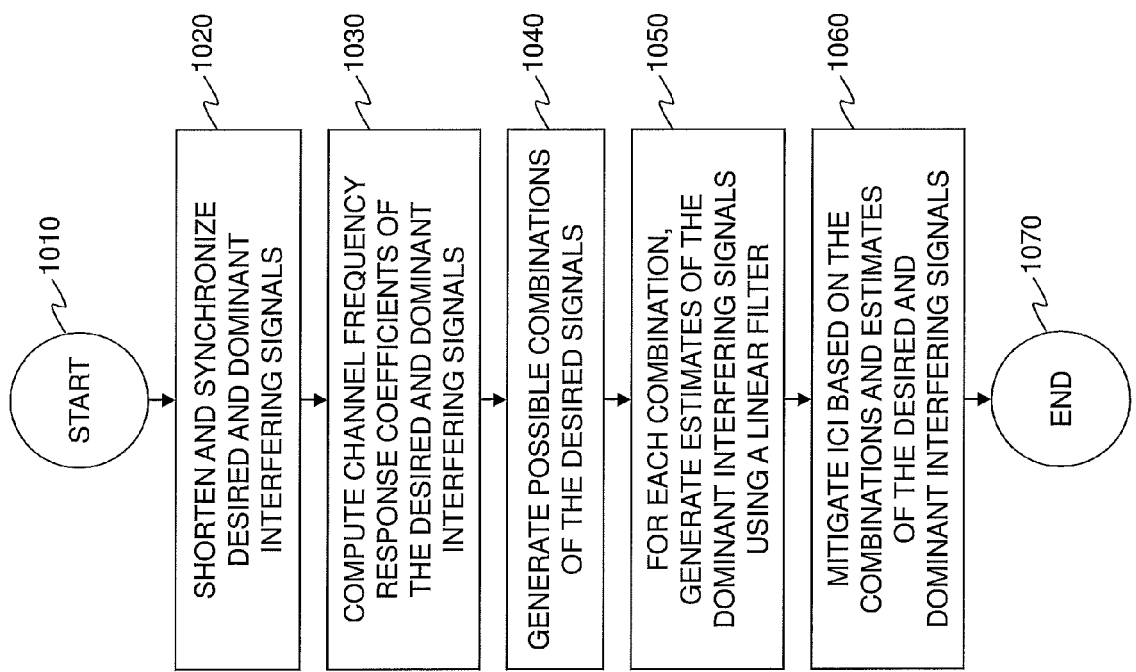
FIG. 10 is a flow diagram of a third embodiment of an ICI mitigation method for OFDMA cellular networks operating in a spatial diversity mode with multiple transmit and receive antennas.

FIG. 10 is a flow diagram of a third embodiment of an ICI mitigation method for OFDMA cellular networks operating in a spatial diversity mode with multiple transmit and receive antennas. The method begins in a start step 1010. In a step 920, the desired and dominant interfering signals are shortened and synchronized. In a step 1030, CFR coefficients are computed for the desired and dominant interfering signals. In a step 1040, possible combinations of the desired signals are generated. In a step 1050, for each combination of the desired signal, estimates of the dominant interfering signals are generated using a linear filter. In a step 1060, ICI is mitigated based on the possible combinations and estimates of the desired and dominant interfering signals. The method ends in an end step 1070.

Hybrid MIMO RC-NMLD Embodiment

RC-NMLD can also be directly applied to hybrid MIMO scenarios where not all of the desired and interfering eNB signals use the same MIMO transmission mode. For example, the desired signal could be in the spatial diversity mode (e.g., Alamouti SFBC) while one dominant interfering signal is in the spatial multiplexing mode and the second dominant interfering signal is in the beamforming mode. For this example, the total number of independent signals (desired plus two dominant interferes) to be jointly estimated at the user terminal is equal to four, assuming two transmit antennas at each eNB. Then, RC-NMLD can perform exhaustive ML search over only two signals (e.g., the ones with smallest signal constellation to reduce the search complexity) while the other two signals are estimated using the simple linear ZF equalizer. The extension to scenarios where the numbers of transmit antennas at the desired and interfering eNBs are different is straightforward to those skilled in the art.

Figure 11:
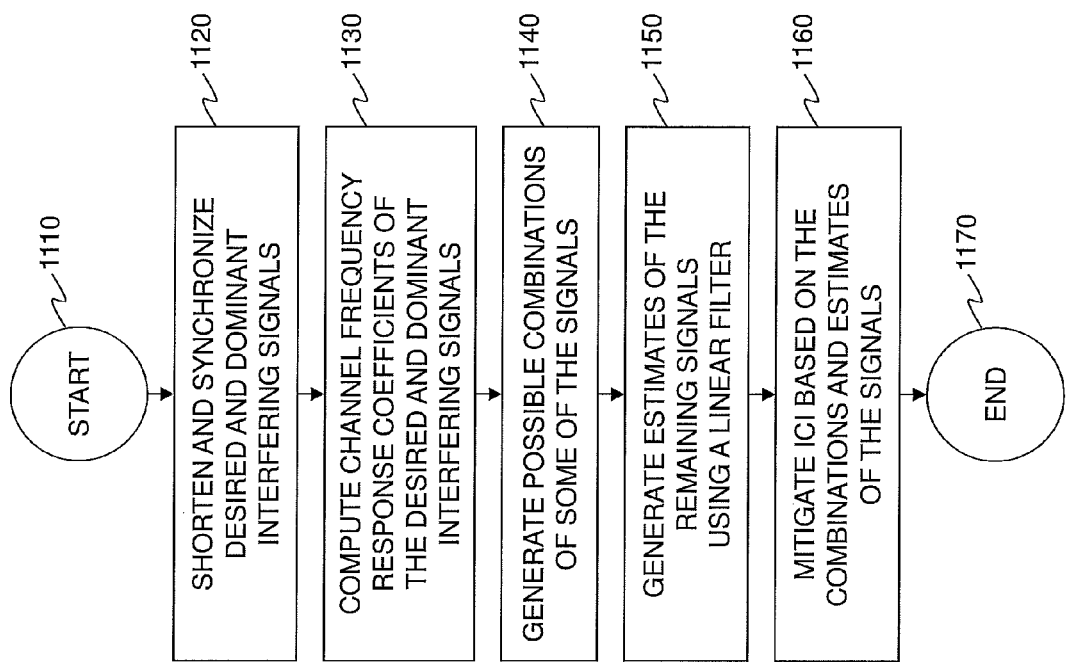
FIG. 11 is a flow diagram of a first embodiment of an ICI mitigation method for OFDMA cellular networks operating in a hybrid MIMO mode with multiple transmit and receive antennas.

FIG. 11 is a flow diagram of a first embodiment of an ICI mitigation method for OFDMA cellular networks operating in a hybrid MIMO mode with multiple transmit and receive antennas. The method begins in a start step 1110. In a step 1120, the desired and dominant interfering signals are shortened and synchronized. In a step 1130, CFR coefficients are computed for the desired and dominant interfering signals. In a step 1140, possible combinations of some of the signals are generated. In a step 1150, estimates of the remaining signals are generated using a linear filter. In a step 1160, ICI is mitigated based on the combinations and estimates of the signals. The method ends in an end step 1170.

D. Reduced-Complexity Joint Intra-Cell Interference and ICI Mitigation Method Embodiments for MIMO-OFDMA Described in this Section D are various method embodiments directed to canceling intra-cell interference while mitigating ICI originating from multiple eNBs. As stated above, existing interference mitigation methods are based on linear detection techniques, such as MMSE and IRC techniques. These linear approaches require the number of receive antennas to be greater than or equal to the number of transmit antennas to achieve satisfactory performance (see, e.g., Verdu, supra). The basic idea of IRC and MMSE detectors is to aggregate the intra-cell interference and ICI with the thermal noise and then apply a whitened matched filter. This strategy might be a good one to deal with ICI, the power level of which is usually comparable with the noise power level, rendering it difficult to detect and cancel.

However, the situation is different for intra-cell interference, which has a power level typically comparable to that of the desired signal. Furthermore, the intra-cell interference signal is perfectly synchronized with the desired signal, since both of them are transmitted from the same eNB. It is recognized herein that an advanced joint intra-cell interference and ICI cancellation/mitigation technique may be developed that performs close to the computationally-prohibitive joint ML detector but at a reduced complexity.

Described herein are various embodiments of a reduced-complexity near-ML downlink interference mitigation/cancellation method for detecting the desired signal using two or more receive antennas at the user terminal. The reduced-complexity method estimates the CIRs of the serving eNB and enables efficient joint detection to improve the network downlink capacity.

1. Model and Assumptions

The following discussion assumes an OFDMA system downlink having $N_r \geq 2$ receiver antennas at the user terminal. The user terminal receives interference signals from M adjacent eNBs, each equipped with an arbitrary number of transmit antennas. Furthermore, it is assumed that knowledge of the desired channel (from the serving eNB to the user terminal of interest) is available at the user terminal. No restrictions are imposed on the synchronization of the ICI signals with the desired signal from the serving cell.

The CIRs from the $i^{th}$ transmit antenna of the serving eNB to the $j^{th}$ receive antenna of the user terminal, denoted by the CIR vector $h_{i,j}$, are assumed to be of lengths less than or equal to that of the cyclic prefix appended to the beginning of each transmitted OFDMA symbol. Therefore, the subcarriers are decoupled and signals are detected on a per-subcarrier basis without performance loss. For any frequency subcarrier, the frequency-domain received signal at the $N_r$ receive antennas of the user terminal is denoted by the $N_r \times 1$ vector r given by (the subcarrier index has been omitted to simplify notation):

$$r = H_s d + H_I g + z + n \qquad (27)$$
$$= \underbrace{H_s d}_{desired\ signal} + \underbrace{H_I g}_{intra\text{-}cell\ interference} + \underbrace{\tilde{n}}_{noise+ICI},$$

where the vectors d and g denote the desired data and the intra-cell interference data of lengths are $N_s$ and $N_I$, respectively. Furthermore, the matrices $H_s$ and $H_I$ denote, respectively, the complex channel frequency response (CFR) matrices of the desired and intra-cell interference signals. The vectors n and z represent the thermal noise and the interfering signals, respectively. The interfering signals are aggregated with the thermal noise in the vector $\tilde{n}$. Note that the channel matrices may be different from each other, since different precoders may be applied to different data streams at the serving eNB.

2. RC-NMLD

One embodiment assumes that knowledge of the signal constellation size for the desired and intra-cell interference signals is available at the user terminal either through a control channel, an estimation process, or by searching over all possible choices. For example, in an LTE downlink, only three possible signal constellations exist: QPSK, 16-QAM, and 64-QAM. Another embodiment presents an estimation technique of the co-scheduled user signal constellation which is not conveyed in the current LTE standard.

For purposes of the following discussion, $M_{s,k}$ and $N_{I,k}$ denote the constellation sizes of the $k^{th}$ data stream of the desired and intra-cell interference signals, respectively. After the CFRs of the (possibly shortened and synchronized) desired and intra-cell interference signals are computed, the intra-cell interference effects are mitigated by performing efficient joint detection over the desired and intra-cell interference using RC-NMLD.

3. RC-NMLD with Knowledge of Signal Constellation Sizes

Joint RC-NMLD performs ML detection on the desired data streams d (which involves a size—

$$\prod_{k=1}^{N_s} M_{s,k}$$

search) and linear detection on the intra-cell interference signal g, as described mathematically below:

(i) For each of the $$\prod_{k=1}^{N_s} M_{s,k}$$

choices of d, $$\hat{g} = dec(w^H(r - H_s d)), \quad (28)$$

is computed, where dec(.) denotes the decision device (i.e., slicer) for a size $\{M_{2I,k}, k=1, 2, \ldots, N_I\}$, corresponding to the elements of g. Furthermore, $w^H$ denotes the linear filter applied to estimate the intra-cell interference signal g. Several criteria may be used to design the linear filter $w^H$. For example, the ZF and MMSE filters are respectively given by:

$$w_{ZF}^H = (H_I^H H_I)^{-1} H_I^H, \text{ and} \quad (29)$$

$$w_{MMSE}^H = (R_g^{-1} + H_I^H R_{\tilde{n}}^{-1} H_I)^{-1} H_I^H R_{\tilde{n}}^{-1}, \quad (30)$$

where $R_{\tilde{n}}$ and $R_g$ are the respective auto-covariance matrices of ñ and g, where ñ denotes the aggregated noise and ICI. If $N_I = 1$, a maximum-SINR criterion can also be employed, which leads to the IRC detector where the filter is given by:

$$w_{max\text{-}SINR}^H = (H_I^H R_{\tilde{n}}^{-1} H_I)^{-1} H_I^H R_{\tilde{n}}^{-1}. \quad (31)$$

(ii) From the $$\prod_{k=1}^{N_s} M_{s,k}$$

combinations of (d, ĝ) computed in the previous step, choose the one which minimizes the following weighted Euclidean distance metric:

$$(r - H_s d - H_I \hat{g})^H R_{\tilde{n}}^{-1} (r - H_s d - H_I \hat{g})$$

Figure 12:
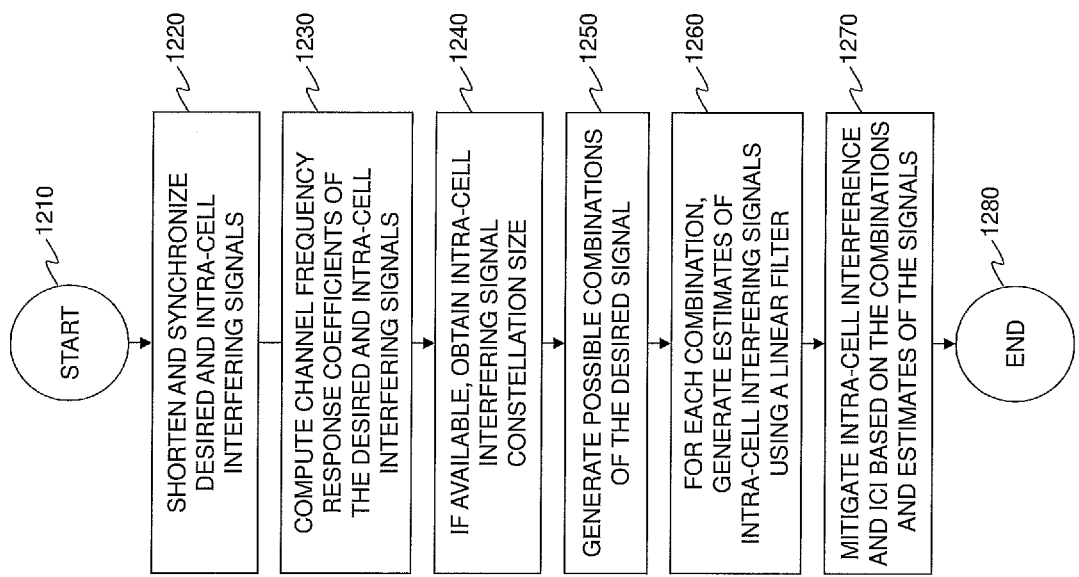
FIG. 12 is a flow diagram of one embodiment of a joint intra-cell interference and ICI mitigation method for MIMO-OFDMA cellular networks.

FIG. 12 is a flow diagram of one embodiment of a joint intra-cell interference and ICI mitigation method for MIMO-OFDMA cellular networks. The method begins in a start step 1210. In a step 1220, the desired and intra-cell interfering signals are shortened and synchronized. In a step 1230, CFR coefficients of the desired and intra-cell interfering signals are computed. In a step 1240, the constellation size of the intra-cell interfering signal is obtained (if available). In a step 1250, possible combinations of the desired signal are generated. In a step 1260, for each combination of the desired signal, estimates of the interfering signals (representing intra-cell interference) are generated using a linear filter. In a step 1270, intra-cell interference and ICI are mitigated based on the combinations and estimates of the desired and intra-cell interference signals with the knowledge of inter-cell interference auto co-variance. The method ends in an end step 1280.

4. Signal Constellation Size Estimation for the Intra-Cell Interference Signal In the MU-MIMO scenario, where the intra-cell interference signal belongs to another user in the same serving cell, the user terminal has no knowledge of the size of the signal constellation used by the other user terminal. However, the implementation of Equation (28) requires this knowledge (i.e., the decision device requires knowledge of the signal constellation from which the intra-cell interference signal g is chosen). For data signals, the LTE and LTE-A standards use three candidate signal constellation sizes, namely: 4-QAM, 16-QAM and 64-QAM. 64-QAM is optional and need not be supported by the user terminal, while it is mandatory for the user terminal to support the first two signal constellation sizes. In this section, a novel method is introduced by which the signal constellation size of the intra-cell interference signal may be estimated. The technique is described mathematically below.

(i) For each of the $$\prod_{k=1}^{N_s} M_{s,k}$$

choices of d, compute:

$$\hat{g}_1 = dec4QAM(w^H(r - H_s d)),$$

$$\hat{g}_2 = dec16QAM(w^H(r - H_s d)), \text{ and}$$

$$\hat{g}_3 = dec64QAM(w^H(r - H_s d)), \quad (32)$$

where dec4QAM(.), dec16QAM(.) dec64QAM(.) denote the decision devices (i.e., slicers) for 4-QAM, 16-QAM and 64-QAM signal constellations, respectively. Furthermore, $w^H$ is computed as in Equation (29), (30) or (31).

(ii) For all the combinations of both $(d, \hat{g}_1)$, $(d, \hat{g}_2)$ and $(d, \hat{g}_3)$ computed in the previous step, compute the following weighted Euclidean distance metrics:

$$\eta_1 = (r - H_s d - H_I \hat{g}_1)^H R_{\tilde{n}}^{-1} (r - H_s d - H_I \hat{g}_1),$$

$$\eta_2 = (r - H_s d - H_I \hat{g}_2)^H R_{\tilde{n}}^{-1} (r - H_s d - H_I \hat{g}_2) \text{ and}$$

$$\eta_3 = (r - H_s d - H_I \hat{g}_3)^H R_{\tilde{n}}^{-1} (r - H_s d - H_I \hat{g}_3).$$

(iii) For each choice of d, compare $\eta_1$ (4-QAM is assumed), $\eta_2$ (16-QAM is assumed) and $\eta_3$ (64-QAM is assumed).

(iv) Repeat steps (i) through (iii) for all data subcarriers in the resource block of interest where the signal constellation size is kept fixed for all users.

(v) Over all possible choice of d and over all subcarriers in the resource block, count the number of times where $\eta_1 < \eta_2$ (call this number $\delta_1$) and count the number of times where $\eta_2 < \eta_1$ (call this number $\delta_2$).

(vi) If $\delta_1 > \delta_2$, decide for 4-QAM; else, decide for 16-QAM.

If the intra-cell interference signal is using 64-QAM, the user terminal of interest will decide for 16-QAM, and the performance loss will not be significant because the 64-QAM symbols are close to the 16-QAM symbols. However, as mentioned earlier, supporting the 64-QAM signal constellation is not mandatory for the user terminal and it is unlikely that the eNB will assign this large signal constellation size (64-QAM) in the MU-MIMO mode where the intra-cell interference is inevitable.

Figure 13:
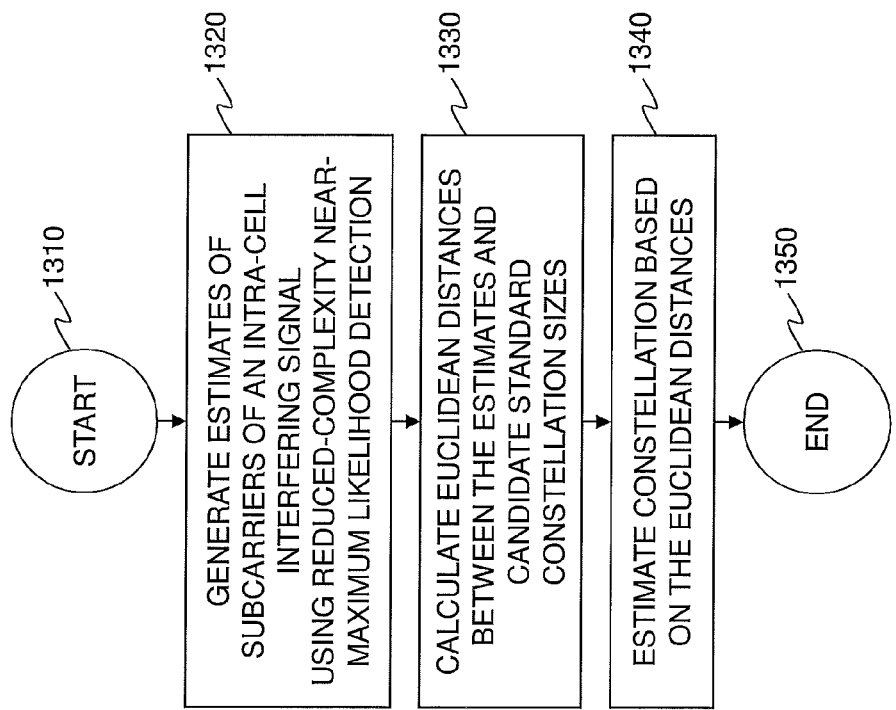
FIG. 13 is a flow diagram of one embodiment of a method of estimating the constellation size of a intra-cell interfering signal.

FIG. 13 is a flow diagram of one embodiment of a method of estimating the constellation size of an intra-cell interfering signal. The method begins in a start step 1310. In a step 1320, estimates of subcarriers of an intra-cell interfering signal are generated using reduced-complexity near-ML detection. In a step 1330, Euclidean distances are calculated between the estimates and candidate constellation sizes. In a step 1340, the constellation that represents the smallest Euclidean distance is estimated to be the correct constellation. The method ends in an end step 1350.

Figure 14:
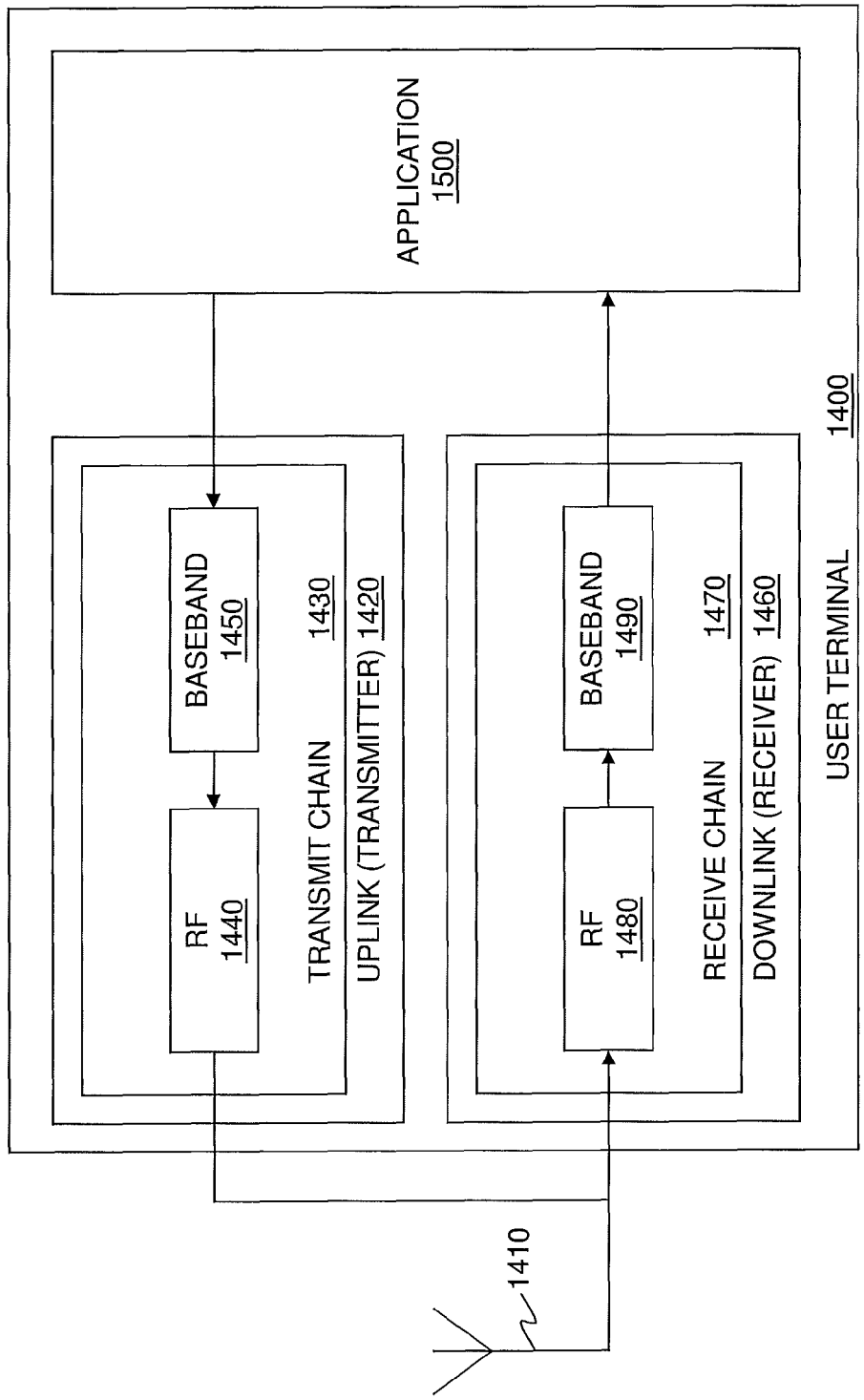
FIG. 14 is a system diagram of a receiver configured to carry out one or more of the mitigation method embodiments of FIGS. 2 and 6 through 12.

FIG. 14 is a system diagram of a user terminal 1400 configured to carry out one or more of the mitigation method embodiments of FIGS. 2 and 6 through 12. The user terminal has an antenna 1410 coupled to an uplink (transmitter) 1420 and a downlink (receiver) 1460.

The uplink (transmitter) 1420 includes a transmit chain 1430 also having a radio frequency (RF) section 1440 and a baseband section 1450. The baseband section 1450 is generally configured to perform Media Access Control (MAC) encoding. The baseband section 1450 is typically also generally configured to perform channel encoding functions, such as turbo, Viterbi or low-density parity decoding (LDPC) encoding. The RF section 1440 is generally configured to process the baseband signal by performing DFT to map and modulate the baseband signal.

The downlink (receiver) 1460 includes a receive chain 1470 having an RF section 1480 and a baseband section 1490. The RF section 1480 is generally configured to perform filtering to separate the baseband signals from carriers. The baseband section 1490 contains a processor, which often takes the form of a microprocessor or a digital signal processor (DSP), and is generally configured to process the baseband signal by performing discrete Fourier transformation (DFT) to de-map and demodulate the baseband signal. The baseband section 1490 is typically also generally configured to perform channel decoding functions, such as turbo, Viterbi or LDPC decoding. Finally, the baseband section 1490 is generally configured to perform MAC decoding.

The uplink (transmitter) 1420 and downlink (receiver) 1460 are configured to communicate with an application 1500, which may provide multimedia, gaming, business or any other service that one could imagine.

Those skilled in the art to which this application relates will appreciate that other and further additions, deletions, substitutions and modifications may be made to the described embodiments.

What is claimed is:

1. A method of mitigating interference in an orthogonal frequency-division multiple access cellular network, comprising:
    selecting at least one dominant interfering signal, wherein intra-cell interfering symbols of said at least one dominant interfering signal are calculated using a non-iterative linear equalizer;
    generating estimates of a desired signal and said at least one dominant interfering signal;
    jointly deciding based on said estimates such that an energy of a residual error is reduced; and
    mitigating interference based on said estimates;
    wherein said selecting, generating, jointly deciding, and mitigating are performed on a processor.

2. The method as recited in claim 1 wherein said energy of said residual error is at least nearly minimized.

3. The method as recited in claim 1 further comprising:
    shortening said desired signal and said at least one dominant interfering signal; and
    synchronizing said desired signal and said at least one dominant interfering signal.

4. The method as recited in claim 1 wherein said generating comprises generating possible combinations of said desired signal, said method further comprising:
    computing channel frequency response coefficients of said desired signal; and
    generating an estimate of multiple ones of said dominant interfering signal using a linear filter for each of said possible combinations.

5. The method as recited in claim 1 wherein said generating comprises generating said possible combinations of said desired signal and said at least one dominant interfering signal, said method further comprising:
    computing channel frequency response coefficients of said desired signal and said at least one dominant interfering signal; and
    computing said estimates using reduced-complexity near-maximum likelihood detection for each of said possible combinations.

6. The method as recited in claim 1 wherein said generating comprises generating said possible combinations of said desired signal using a beamformer vector, said method further comprising:
    computing channel frequency response coefficients of said desired signal; and
    computing said estimates using reduced-complexity near-maximum likelihood detection for each of said possible combinations.

7. The method as recited in claim 1 wherein said generating comprises generating said possible combinations of desired signal and said at least one dominant interfering signal, said method further comprising:
    computing channel frequency response coefficients of said desired signal and said at least one dominant interfering signal; and
    generating an estimate of another of multiple ones of said dominant interfering signal using a linear filter.

8. The method as recited in claim 1 wherein said generating comprises generating said possible combinations of said desired signal, said method further comprising:
    computing channel frequency response coefficients of said desired signal and said at least one dominant interfering signal; and
    generating estimates of said at least one dominant interfering signal using a linear filter.

9. The method as recited in claim 1 wherein said generating comprises generating said possible combinations of some of said desired signal and at least one dominant interfering signal, said method further comprising:
    computing channel frequency response coefficients of said desired signal and fewer than all of said dominant interfering signal; and
    generating estimates of remaining ones of said at least one dominant interfering signal using a linear filter.

10. The method as recited in claim 1 wherein one of said at least one dominant interfering signal is an intra-cell interfering signal.

11. The method as recited in claim 1 wherein said generating comprises:
    processing channel knowledge of said desired signal and said at least one dominant interfering signal; and
    processing constellations of said desired signal and said at least one dominant interfering signal.

12. A method of mitigating interference in a multiple-input, multiple-output orthogonal frequency-division multiple access cellular network, comprising:
 obtaining a constellation size of an intra-cell interfering signal;
 generating estimates of a desired signal and said intra-cell interfering signal using joint reduced-complexity near-maximum-likelihood detection;
 computing statistics of inter-cell interfering signals; and
 mitigating interference based on said estimates and statistics;
 wherein said obtaining, generating, computing, and mitigating are performed by a processor.

13. The method as recited in claim 12 wherein said generating comprises:
 processing channel knowledge of said desired signal and said at least one dominant interfering signal; and
 processing constellations of said desired signal and said at least one dominant interfering signal.

14. The method as recited in claim 13 wherein said generating comprises:
 canceling effects of possible combinations of said desired signal and said intra-cell interfering signal;
 calculating a weighted energy of residual error for each said possible combination; and
 deciding jointly on said desired signal and said intra-cell interfering signal that minimize a weighted residual error energy.

15. The method as recited in claim 14 wherein said desired signal and said intra-cell interfering signal are intended for a same user.

16. The method as recited in claim 14 wherein said desired signal and said intra-cell interfering signal are intended for different users.

17. The method as recited in claim 12 wherein said obtaining is not possible and said method further comprises:
 computing estimates of said intra-cell interfering signals in a constellation space;
 determining options for said intra-cell interference signal for standardized signal constellations; and
 deciding jointly on said desired signal and said intra-cell interfering signal.

18. The method as recited in claim 17 wherein said determining comprises:
 estimating intra-cell interference for said options;
 detecting possible intra-cell interfering signal constellations; and
 determining a weighted residual error energy of said combinations.

19. The method as recited in claim 17 wherein said deciding comprises:
 comparing only 4-QAM and 16-QAM constellations; and
 assigning intra-cell interference signal constellation from said 4-QAM and 16-QAM constellations irrespective of said intra-cell interfering signal.

20. A user terminal configured to effect wireless communication with an orthogonal frequency-division multiple access cellular network and comprising:
 an antenna;
 an uplink coupled to said antenna; and
 a downlink coupled to said antenna and including a baseband section configured to:
 select at least one dominant interfering signal, wherein intra-cell interfering symbols of said at least one dominant interfering signal are calculated using a non-iterative linear equalizer,
 generate estimates of a desired signal and said at least one dominant interfering signal,
 jointly decide based on said estimates such that an energy of a residual error is reduced, and
 mitigate interference based on said estimates.

21. The user terminal as recited in claim 20 wherein said energy of said residual error is at least nearly minimized.

22. The user terminal as recited in claim 20 wherein said downlink is further configured to:
 shorten said desired signal and said at least one dominant interfering signal; and
 synchronize said desired signal and said at least one dominant interfering signal.

23. The user terminal as recited in claim 20 wherein said downlink is further configured to:
 generate possible combinations of said desired signal;
 compute channel frequency response coefficients of said desired signal; and
 generate an estimate of multiple ones of said dominant interfering signal using a linear filter for each of said possible combinations.

24. The user terminal as recited in claim 20 wherein said downlink is further configured to:
 generate said possible combinations of said desired signal and said at least one dominant interfering signal;
 compute channel frequency response coefficients of said desired signal and said at least one dominant interfering signal; and
 compute said estimates using reduced-complexity near-maximum likelihood detection for each of said possible combinations.

25. The user terminal as recited in claim 20 wherein said downlink is further configured to:
 generate said possible combinations of said desired signal using a beamformer vector;
 computing channel frequency response coefficients of said desired signal; and
 computing said estimates using reduced-complexity near-maximum likelihood detection for each of said possible combinations.

26. The user terminal as recited in claim 20 wherein said downlink is further configured to:
 generate said possible combinations of desired signal and said at least one dominant interfering signal;
 compute channel frequency response coefficients of said desired signal and said at least one dominant interfering signal; and
 generate an estimate of another of multiple ones of said dominant interfering signal using a linear filter.

27. The user terminal as recited in claim 20 wherein said downlink is further configured to:
 generate said possible combinations of said desired signal;
 compute channel frequency response coefficients of said desired signal and said at least one dominant interfering signal; and
 generate estimates of said at least one dominant interfering signal using a linear filter.

28. The user terminal as recited in claim 20 wherein said downlink is further configured to:
 generate said possible combinations of some of said desired signal and at least one dominant interfering signal, said method further comprising:
 compute channel frequency response coefficients of said desired signal and fewer than all of said dominant interfering signal; and
 generate estimates of remaining ones of said at least one dominant interfering signal using a linear filter.

29. The method as recited in claim 20 wherein one of said at least one dominant interfering signal is an intra-cell interfering signal.

30. The user terminal as recited in claim 20 wherein said downlink is further configured to:
   process channel knowledge of said desired signal and said at least one dominant interfering signal; and
   process constellations of said desired signal and said at least one dominant interfering signal.

* * * * *